(12) United States Patent
Kimura et al.

(10) Patent No.: US 7,549,439 B2
(45) Date of Patent: Jun. 23, 2009

(54) FLOW CONTROL DEVICE

(75) Inventors: Motoyasu Kimura, Tokyo (JP); Tomoei Kimura, Tokyo (JP)

(73) Assignee: Kimura Corporation, Setagaya-ku (JP)

( * ) Notice: Subject to any disclaimer, the term of this patent is extended or adjusted under 35 U.S.C. 154(b) by 144 days.

(21) Appl. No.: 10/579,590

(22) PCT Filed: Apr. 26, 2004

(86) PCT No.: PCT/JP2004/006004

§ 371 (c)(1),
(2), (4) Date: Jan. 23, 2007

(87) PCT Pub. No.: WO2005/049928

PCT Pub. Date: Jun. 2, 2005

(65) Prior Publication Data

US 2007/0102046 A1   May 10, 2007

(30) Foreign Application Priority Data

Nov. 18, 2003  (JP)  ............... 2003-388152
Nov. 18, 2003  (JP)  ............... 2003-388153

(51) Int. Cl.
*G05D 16/20* (2006.01)
(52) U.S. Cl. .................................. 137/487.5
(58) Field of Classification Search ............ 137/101.19, 137/101.21, 487.5
See application file for complete search history.

(56) References Cited

U.S. PATENT DOCUMENTS

| 4,007,755 A | * | 2/1977 | Lerner et al. | ............ 137/101.21 |
| 4,838,310 A | * | 6/1989 | Scott et al. | ............. 137/624.14 |
| 5,427,350 A | * | 6/1995 | Rinkewich | ............... 251/30.01 |
| 6,119,720 A | * | 9/2000 | Isaacson et al. | ............. 137/459 |
| 7,064,671 B2 | * | 6/2006 | Vanderah et al. | ......... 340/636.1 |
| 2003/0041370 A1 | | 3/2003 | Chung | |
| 2003/0201892 A1 | * | 10/2003 | Chance et al. | ........... 340/568.2 |

FOREIGN PATENT DOCUMENTS

| GB | 2 312 711 A | 11/1997 |
| JP | 01-098928 A1 | 4/1989 |
| JP | 04-318436 A1 | 11/1992 |
| JP | 07-189311 | 7/1995 |
| JP | 2002-047709 A1 | 2/2002 |
| JP | 2002-201680 A1 | 7/2002 |
| JP | 2002-294839 A1 | 10/2002 |

* cited by examiner

*Primary Examiner*—Stephen M Hepperle
*Assistant Examiner*—William McCalister
(74) *Attorney, Agent, or Firm*—Burr & Brown

(57) ABSTRACT

A flow control device having a power saving effect in addition to a water saving effect. Further, another object is to provide a flow control device easy to install, maintain and manage. The flow control device of the invention comprises a flush valve device having a main control valve in a path leading from an inlet to an outlet, a flowmeter unit for converting the presence or absence of flow of washing water leading from the inlet to the outlet into a pulse signal and outputting the latter, a control device for controlling the opening and closing of the main control valve according to the output of the flowmeter unit, and a power generating unit for generating power by using the flow of the washing water as power, wherein at least part of the power obtained in the power generating unit is supplied to the control device.

16 Claims, 17 Drawing Sheets

FLOW CONTROL DEVICE

TECHNICAL FIELD

The present invention relates to a flow control device of an automatic water stop type for use in a water section such as a stool.

BACKGROUND ART

An example of a flow control device of this type includes a device equipped with a flush valve device disclosed in JP 07-189311 A, which was previously filed by the applicant of the present invention.

In particular, the flow control device includes a main control valve arranged in a path leading from an inlet to an outlet, a pressure chamber positioned behind the main control valve and has therein a spring for biasing the main control valve toward a valve seat while keeping a balance with respect to the inlet side, a pilot valve for allowing the main control valve to open by releasing pressure in the pressure chamber, and a flowmeter unit 81 for measuring a flow rate of water flowing from the inlet to the outlet. Based on an output of the flowmeter unit, a valve opening of the pilot valve is automatically controlled and an appropriate amount of the water is caused to flow through the outlet to be discharged to a stool or the like.

In recent years, measures for environmental issues are taken in various fields, so an improvement in an environmental issue of the flush valve device of this type is also in demand.

In particular, according to an intensive study of the inventors of the present invention, in a field of the flush valve device of the automatic water stop type having a water-saving effect higher than a manual water stop valve, there was found a point to be improved about a method of supplying electricity to a control system of the flush valve device.

Further, in the flush valve device of the automatic water stop type, presence/absence of discharge and a period of time for discharge are managed by performing various controls based on a sensor output. Therefore, the device tends to be complicated in structure as compared to the manual water stop valve. In addition, in mounting the device to an installation place, tasks for leading an external power thereinto, etc. are required. Besides, the flush valve device of this type may obtain the high water-saving effect, so there is a fear of the device being stolen. Therefore, improvements in maintenance/management after construction have also been required.

On the other hand, in facilities such as public lavatories where a plurality of flow control devices of this type are installed, it is possible to grasp a used amount of water with reference to a water meter provided to a water supply main pipe. However, the water meter indicates a flow rate in the whole facility including both stools and wash stands, so it was difficult to individually grasp the flow rate of the water consumed in each of the stools and the wash stands.

Among others, in the flow rate control valve composed of the flush valve device of the automatic water stop type, the flow rate of the water to be discharged is managed through an automatic control of the pilot valve based on the sensor output. Therefore, it is important to accurately grasp the flow rate of water in each of the flow rate control valve for effectively performing the maintenance/management after the construction.

Further, the flow rate of the water involved in discharge is information useful for the management of the facility. By accurately grasping the flow rate, it is possible to definitely grasp the water-saving effectiveness or the like involved in, for example, adoption of the flush valve device of the automatic water stop type.

The present invention has been made in view of such the technical background. It is an object of the present invention to provide a flow control device having a power-saving effect in addition to the water-saving effect. Further, it is another object of the present invention to provide the flow control device which also facilitates construction, maintenance, and management thereof.

DISCLOSURE OF THE INVENTION

The present invention provides a flow control device, including: a flush valve device having a control valve in a path leading from an inflow opening to an outflow opening; a detection portion for outputting presence/absence of a flow of a fluid flowing from the inflow opening to the outflow opening by converting in a form of an electric signal; and a control device for controlling opening and closing of the control valve based on the output of the detection portion, characterized in that: the flow control device further includes an electricity generating device for generating electricity by using the flow of the fluid as power; and at least a part of the electricity obtained in the electricity generating device is supplied to the control device.

The flow control device of the present invention thus constructed includes the electricity generating device using the flow of the fluid as the power. Besides, at least a part of the electricity generated by the electricity generating device is supplied to the control device, and is utilized, for example, as a power source required for analyzing the output from the detection portion in the control device and for opening and closing the control valve. Note that, the installation position of the electricity generating device can be appropriately changed in accordance with various specifications, installation spaces, or the like, for example, to the path leading from the inflow opening to the outflow opening, an upstream of the inflow opening, a downstream of the outflow opening, or the like. Further, the supply of at least a part of the electricity to the control device is not limited to be a direct supply, and for example, it may be an indirect supply such as a supply through the detection portion.

Moreover, the flow control device of the present invention suppresses consumption of the electricity by supplying the electricity generated by itself to the control device as described above. In addition, installation of an external power supply is substantially unnecessary for the control device or the like, so in installation of the flush valve device, it is also possible to extensively improve the construction property thereof.

Further, the flow control device may include a capacitor for storing at least a part of the electricity obtained in the electricity generating device.

With this construction, at least a part of the electricity generated is stored in the capacitor. Therefore, even in a non-discharge period for which the electricity generation is stopped, by using the electricity stored in the capacitor, it is possible to perform various controls of the control device.

Further, the control device may include a circuit for monitoring a water leakage in the path leading to the outflow opening.

With this construction, the water leakage in the path leading to the outflow opening is monitored by the water leakage monitoring circuit provided in the control device. As a result, for the maintenance after the construction, by grasping information obtained by the water leakage monitoring circuit by means of, for example, lighting of an indicator integrated in the control device or a tester, it is possible to easily grasp, for example, presence/absence of the water leakage following the deterioration with time of the control valve or the like.

Further, the control device may include a circuit for calculating a flow rate of a fluid discharged through the outflow opening, based on an electric signal obtained in the detection portion, and a discharge control circuit for closing the control valve in response to information indicating that the flow rate reaches the discharge stop flow rate at which a discharge should be stopped. The water leakage monitoring circuit may judge an occurrence of the water leakage in response to information indicating that a flow of a fluid is continuously detected in the detection portion after the flow rate reaches the discharge stop flow rate.

With this construction, when the flow rate calculated in the flow rate calculation circuit reaches the discharge stop flow rate, the control valve is shut off by a function of the discharge control circuit, and the flow of the fluid also stops. Further, in this state, the water leakage monitoring circuit detects an occurrence of the water leakage due to information indicating that the detection portion still continuously detects the flow of the fluid. That is, the water leakage monitoring circuit judges the occurrence of the water leakage when water is still discharged although the state is reached at which the discharge should be stopped.

Note that, the term, "continuously" described above may include a controlling state of the detection portion, in which the detection portion detects the presence/absence of the flow of the fluid after a certain period has elapsed.

Further, the control device may include a flow rate calculating circuit for calculating a flow rate of a fluid, discharged through the outflow opening, based on the electric signal obtained in the detection portion and a discharge control circuit for closing the control valve in response to information indicating that the flow rate reaches a discharge stop flow rate at which a discharge should be stopped. The water leakage monitoring circuit may detect a water leakage in response to information indicating that an electricity generation is continuously performed in the electricity generating device after the flow rate has reached the discharge stop flow rate.

With this construction, the water leakage monitoring circuit judges the occurrence of the water leakage when the electricity generation is still continuously performed although the state is reached at which the discharge should be stopped.

Note that, the term, "continuously" described above may include not only the state at which the electricity generation is continuously performed immediately after the discharge, but also a state at which the electricity generation is performed after a certain period has elapsed since the discharge stops.

Further, The control device may include a detection monitoring circuit for monitoring an operation failure of the detection portion. The detection monitoring circuit may detect the operation failure of the detection portion in response to information indicating that the electricity generating device is in an electricity generating state and the flow of the fluid is not detected in the detection portion.

With this construction, the control device is provided with the detection monitoring circuit for monitoring the operation failure of the detection portion. Further, in the detection monitoring circuit, the presence/absence of the electricity generation by the electricity generating device and the presence/absence of the flow obtained through the detection portion are used as parameters to monitor the presence/absence of the operation failure of the detection portion. As a result, for the maintenance after the construction, by grasping the information obtained by the detection monitoring circuit by means of, for example, presence/absence of lighting of the indicator or the like integrated in the control device, it is possible to easily grasp, for example, the operation failure following to the deterioration with time of the detection portion.

Further, the control device may include an electricity generation monitoring circuit for monitoring an operation failure of the electricity generating device. The electricity generation monitoring circuit may detect the operation failure of the electricity generating device in response to information indicating that the flow of the fluid is detected in the detection portion and the electricity generating device is not in an electricity generating state.

With this construction, the control device is provided with the electricity generation monitoring circuit for monitoring the operation failure of the electricity generating device. Further, in the electricity generation monitoring circuit, the presence/absence of the electricity generation by the electricity generating device and the presence/absence of the flow obtained through the detection portion are used as parameters to monitor the presence/absence of the operation failure of the electricity generating device. As a result, for the maintenance after the construction, by grasping the information obtained by the electricity generation monitoring circuit through, for example, the indicator or the like integrated in the tester or the like, it is possible to easily grasp the operation failure following to the deterioration with time, etc. of the electricity generating device.

Further, the path leading from the inflow opening to the outflow opening may be composed of a conductive valve housing. The control device may include a theft-prevention circuit, which includes the conductive valve housing as a part of the circuit, for issuing an alert in response to the cut off of the circuit.

With this construction, for example, the valve housing is formed of a material having a sufficient conductivity such as a casting. The control device is provided with the theft-prevention circuit including the conductive valve housing as a part of the circuit. Therefore, when the valve housing is removed from a piping or the like to which the valve housing is provided, a part of the theft-prevention circuit is electrically cut off. In the theft-prevention circuit, upon the cutting off of the circuit, removal of the valve housing is sensed. At the same time, the circuit issues an alert. As a result, for example, it is possible to prevent the flush valve device from being stolen, etc.

Further, the detection portion may include a rotating impeller, arranged in the path leading from the inflow opening to the outflow opening, for rotating while receiving a flow of the fluid. The electricity generating device may include an electricity generating body for rotating with the rotating impeller.

With this construction, the rotating impeller provided to the detection portion and the electricity generating body (for example, stator coil and magnet) provided to the electricity generating device integrally rotate. Note that, it suffices that the rotating impeller and the electricity generating body are mechanically connected to each other. For example, the rotating impeller and the electricity generating body may be connected to each other through a common shaft, or they may be connected through a power transmission mechanism such as a gear. The structure of the rotating impeller and the electricity generating body are not limited to the structure in which they are integrated to each other. Further, with this construction, both the detection and the electricity generation can be performed by means of a single rotating body, so the flush valve device can be reduced in size.

Further, the flow control device may include a plurality of flush valve devices. The flush valve devices may include inflow openings connected to a common water supply pipe. The electricity generating device may be provided on the water supply pipe side.

With this construction, a flush valve unit is composed of a plurality of flush valve devices. The flush valve devices are connected to the common water supply pipe. Further, the electricity generating device is provided on the water supply pipe side. When any of the plurality of flush valve devices is in a discharge state, the electricity generation is performed due to the discharge. Accordingly, even when any flush valve device is in the non-discharge state, due to the electricity generation owing to the discharge of other flush valve devices, electricity to be supplied to the flush valve device in the non-discharge state is compensated.

Further, the present invention is characterized by including: a flow rate calculating portion for calculating a flow rate of a fluid, which is discharged through the outflow opening, based on an electric signal obtained in the detection portion; a control portion for controlling opening and closing of the control valve based on whether or not the flow rate calculated in the flow rate calculating portion reaches a discharge stop flow rate at which a discharge should be stopped; and an output portion for outputting the flow rate calculated in the flow rate calculating portion to the outside of the control portion.

The flow control device according to the present invention constructed as described above, is provided with the output portion for outputting the calculated flow rate to the outside. That is, with this construction, the flow control device includes the output portion not only for using the calculated flow rate for the opening and closing of the control valve, but also for outputting the calculated flow rate to the outside. Therefore, in maintaining and managing the flow rate control valve, the flow rate outputted from the output portion can be utilized for the maintenance or the like of the flow rate control valve by grasping the outputted flow rate through a flow rate counter provided to the tester, which can be connected to the output portion.

Note that, the term, "output to the outside of the control portion" described above is not only a direct output from the flow rate calculating portion, but may be an indirect output through the control portion. It is sufficient that the output is an output with which the calculated flow rate can be obtained from the outside.

Further, the term, "flow rate" according to the present invention is a numeric value with which an outflow amount of the fluid can be grasped, and includes a value indicating a volume such as liter or the like, a time period in which the discharge, which can be converted to the flow rate, is carried out, and the like.

Further, the output portion may include a display device for displaying the outputted flow rate.

With this construction, the output portion is provided with the display device, and the flow rate outputted to the output portion is displayed on an exterior portion of the display device. Therefore, with reference to the display device, an amount of the fluid involved in the discharge can be grasped.

Further, the flow control device may include a storage portion for storing the flow rate of the water to be outputted to the output portion, and a time or date on which a discharge involving the output is performed being stored in correspondence with each other.

With this construction, in outputting the flow rate, the time or date of the discharge involving the output is outputted in correspondence with the discharge involving the output.

Therefore, it is possible to not only grasp the flow rate, but also obtain more accurate information owing to the corresponding date and time or the like.

Further, the output portion may sum up the flow rate of the fluid discharged per unit period to output the cumulative flow rate. With this construction, in grasping the flow rate, by adopting, for example, the number of days, time period, or the like as a unit or the like, it is possible to grasp the flow rate of the fluid discharged in that unit period.

Further, the control portion may include: a flow rate difference calculating circuit for calculating over and short of the calculated flow rate by comparing the calculated flow rate with a predetermined target discharge rate; and an adjustment circuit for adjusting a flow rate to be discharged, based on the flow rate calculated in the flow rate difference calculating circuit.

With this construction, the calculated flow rate and the predetermined target discharge rate are compared for calculating over and short of the calculated flow rate, and, at the same time, for adjusting the flow rate of the water to be discharged based on an adjustment value (flow rate) according to the over and short. Note that, the term, "adjust the flow rate of the water to be discharged" described above is an adjustment of an opening time of the control valve and an adjustment of the target discharge rate. When the flow rate involved in the discharge can be substantially modified, the parameter, which is an object of the adjustment, can be appropriately modified.

Further, the output portion may include a signal portion for informing that there are overages and shortages in the flow rate of the discharged fluid when they occur.

With this construction, the output portion is provided with the signal portion. The signal portion compares, for example, the calculated flow rate with the discharge stop flow rate for informing that the flow rate has over and short when the flow rate has over and short. Accordingly, through the signal from the signal portion, it is possible to easily grasp the over and short of the fluid involved in the discharge.

As described above, according to the present invention, it is possible to provide the flow control device having the power-saving effect in addition to the water-saving effect. Further, it is possible to provide the flow control device which also facilitates construction, maintenance, and management.

BEST MODES FOR CARRYING OUT THE INVENTION

In the following, a preferred embodiment of the present invention is described with reference to the drawings.

In this embodiment, the description is made by taking, as an example, a flush valve unit (flow control device) to which a flush valve device is applied as a water stop valve for a stool.

Figure 3:
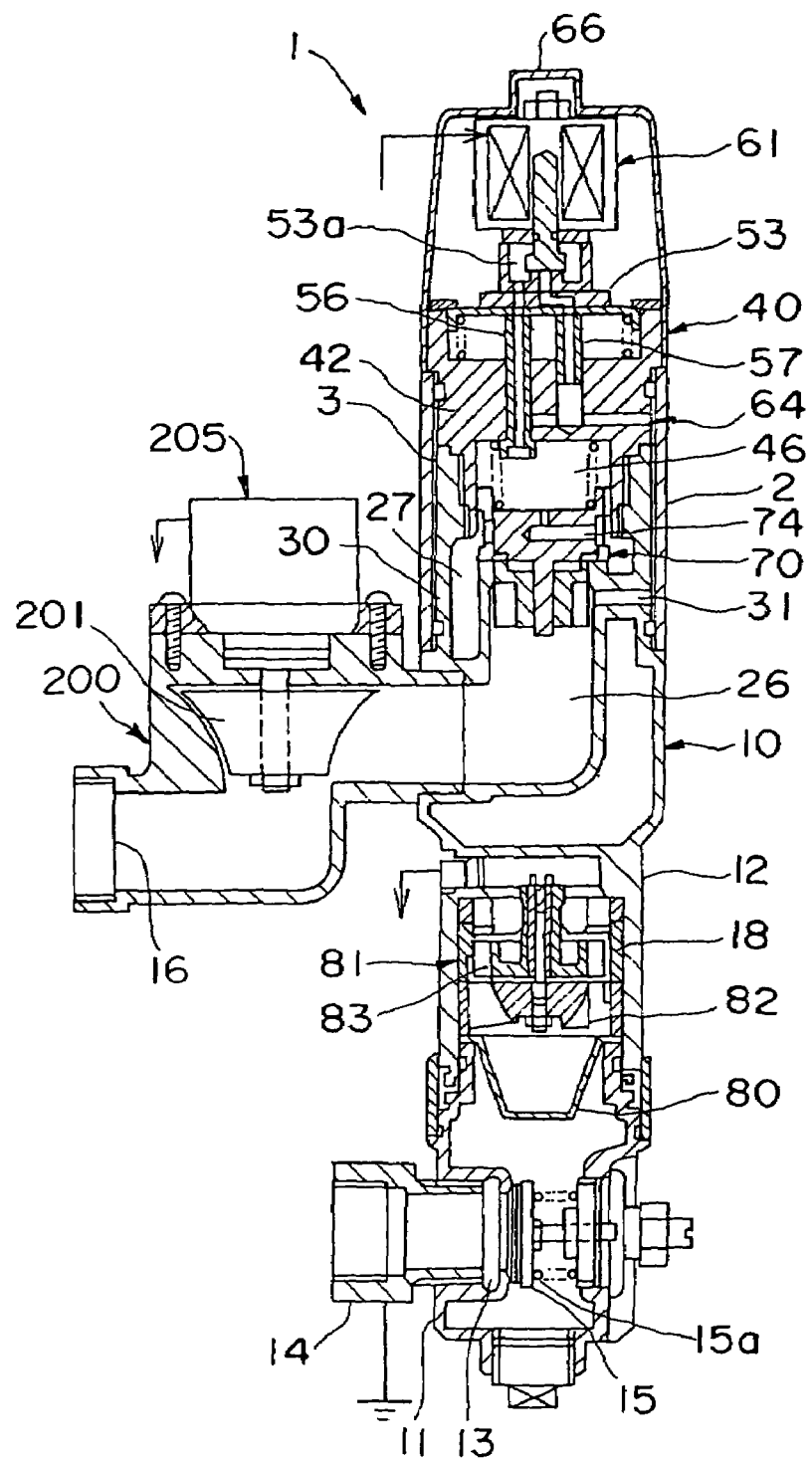
FIG. 3 is a longitudinal sectional view of the entire flush valve device according to the embodiment.

As shown in an entire longitudinal sectional view of FIG. 3, a flush valve device 1 includes a first valve housing 10 and a second valve housing 40 which are connected to each other by a sleeve 2 and an external housing 200 connected to the second valve housing 40.

The first valve housing 10 is composed of an inlet side block 11 and an outlet side block 12. The inlet side block 11 includes an inlet 13 on a lower portion. The inlet 13 is connected to an inflow tube 14. The inlet 13 is provided with a check valve 15, which opens and closes due to a water pressure of the washing water supplied from the inflow tube 14, being biased toward a closing direction by a coil spring 15*a*. An upper portion of the inlet side block 11 accommodates a strainer 80.

An upper portion of the outlet side block 12 includes an external housing 200 having an outlet 16 at one end and connected to the first housing 10 at the other end. Further, the outlet 16 is connected an outflow tube (not shown) connected to a discharge opening of a stool. The washing water flow out from the first valve housing 10 is discharged to the stool through the external housing 200 and the outflow tube.

The external housing 200 includes an impeller 201 provided in a path leading to the outlet 16 and an electricity generating unit 205 composed of an electricity generating rotor (electricity generating body) connected to a rotating shaft of the impeller, a magnet surrounding the electricity generating rotor, and the like. The electricity generating unit 205 generates electricity by receiving a flow of the washing water flowing from the first valve housing 10 to the outlet 16. Further, a flowmeter accommodating chamber 18 is formed in the lower portion of the outlet side block 12 to accommodate a flowmeter unit 81.

Figure 4:
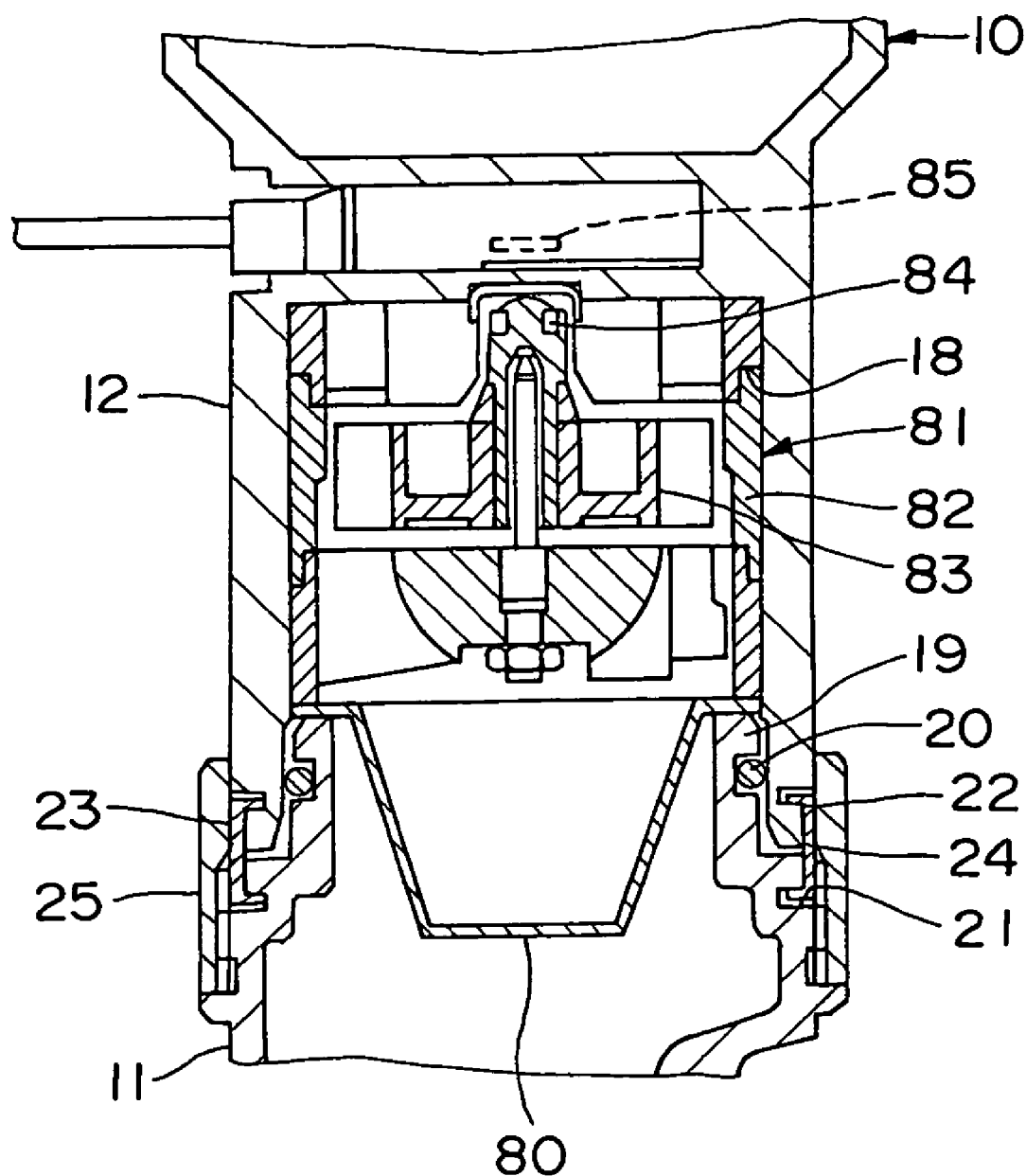
FIG. 4 is an enlarged longitudinal sectional view around a flowmeter unit of the flush valve device according to the embodiment.

As shown in FIG. 4, the flowmeter unit 81 is composed of a rotating impeller 83 rotatably supported by a casing 82 and a hole device 84 provided to the rotating impeller 83. A change of a magnetic force detected due to rotation of the hole device 84 which integrally rotates with the rotating impeller 83 is recognized in a form of a pulse signal. Pulses are counted in a pulse counter 85 arranged in the outlet side block 12. The counted pulses are outputted to a control device 100 electrically connected to the flowmeter unit 81. The control device 100 measures an amount of the washing water flowing in the flowmeter accommodating chamber 81 by performing conversion from the number of pulses.

The inlet sideblock 11 and the outlet sideblock 12 are connected as described below. A small diameter portion 19 provided at a tip of the inlet side block 11 is inserted into the lower portion of the outlet side block 12 as shown in FIG. 4. A gap between the small diameter portion 19 and the outlet side block 12 is sealed by a seal ring 20. Annular grooves 21 and 22 are formed in an outer peripheral surface of the upper portion of the inlet side block 11 and an outer peripheral surface of the lower portion of the outlet side block 12, respectively. In the grooves 21 and 22, a pair of connecting rings 23 and 24 on the left and right, each of which has a U shape when viewed in longitudinal sectional view and a semi-circular shape when viewed in plan view, are inserted, respectively, so as to bridge over the inlet side block 11 and the outlet side block 12. A cylindrical sleeve 25 screwed into the inlet side block 11 is fitted around the connecting rings 23 and 24 to prevent the connecting rings 23 and 24 from dropping.

In the connecting state, the flowmeter unit 81 in the accommodating chamber 18 and the strainer 80 are held by being sandwiched between an inner wall of the accommodating chamber 18 and a tip surface of the small diameter portion 19. Note that, when an elastic spacer is intervened between the tip surface of the small diameter portion 19 and the strainer 80, it is possible to absorb a production error, a construction error, and the like, thereby being preferable.

Figure 1:
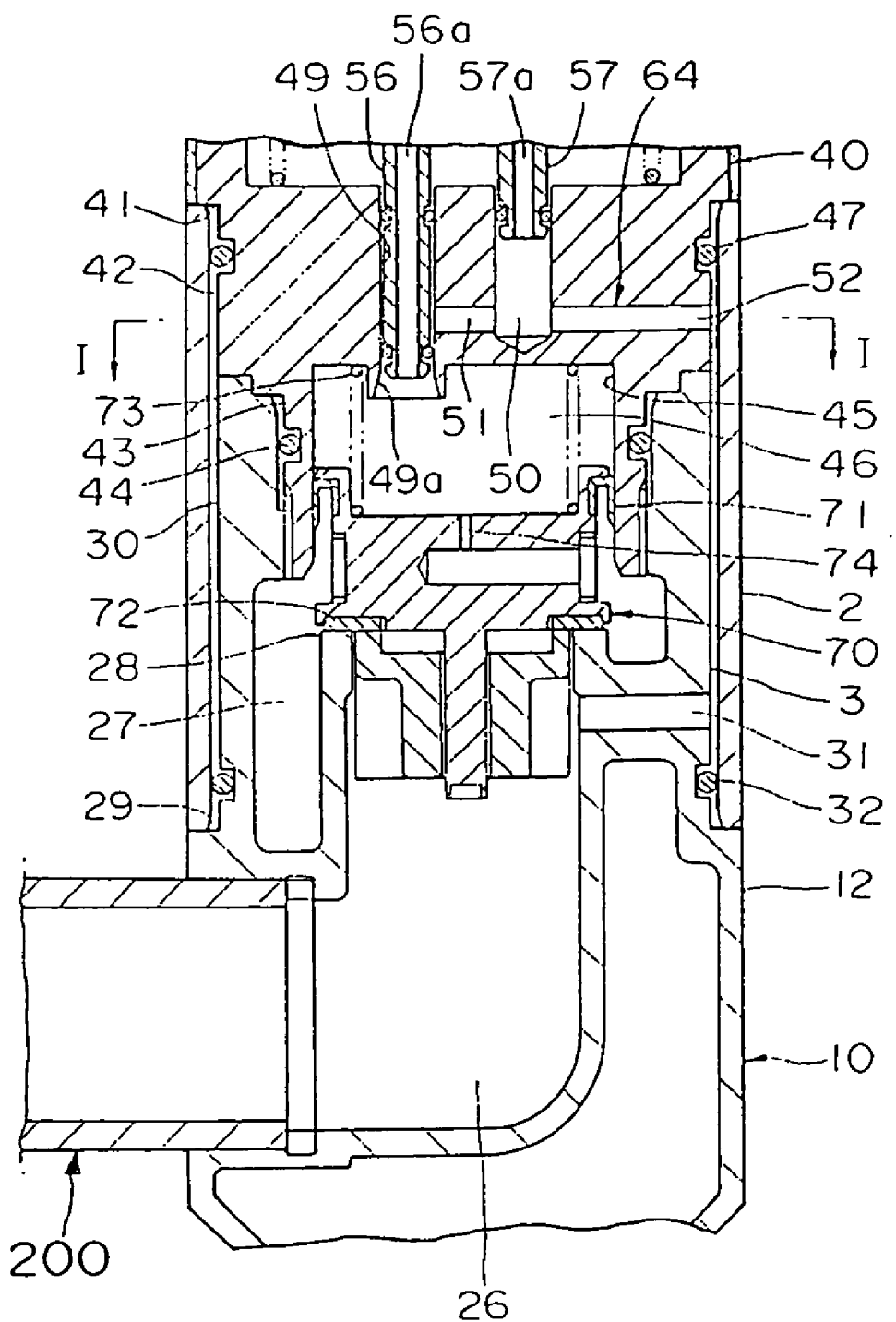
FIG. 1 is an enlarged longitudinal sectional view in the vicinity of an outlet of a flush valve device according to an embodiment of the present invention.
Figure 2:
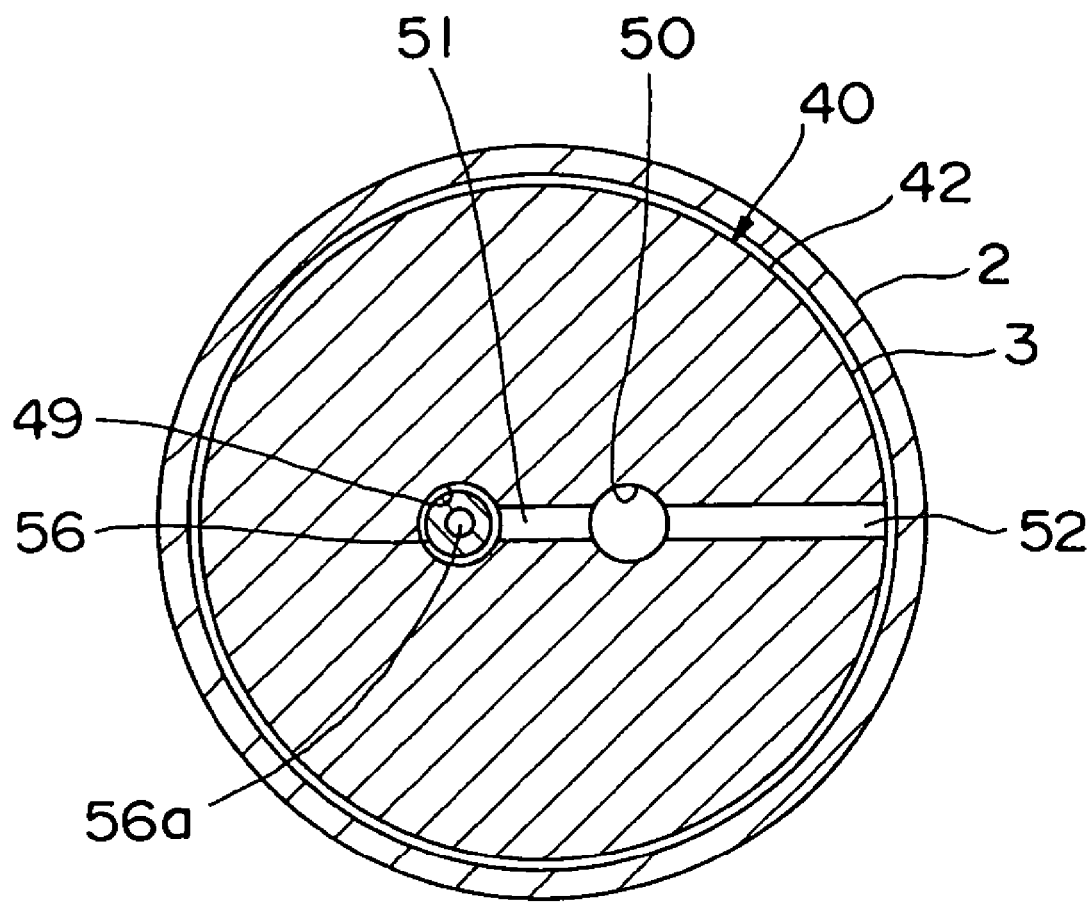
FIG. 2 is a sectional view taken along the line I-I of FIG. 1 according to the embodiment.

In FIG. 1, the outlet side block 12 of the first valve housing 10, there are provided a low pressure chamber 26 which is continuous with the external housing 200 and which extends to the outlet 16 not shown , and a main valve chamber 27 continuous with the low pressure chamber 26 and is formed so as to surround the low pressure chamber 26. A valve seat 28 is formed between the low pressure chamber 26 and the main valve chamber 27. Note that, the main valve chamber 27 is continuous with the accommodating chamber 18 (not shown).

Further, as shown in FIG. 1, a step portion 29 is formed in the outer peripheral surface of the upper portion of the outlet side block 12. A portion above the step portion 29, is formed to be a small diameter portion 30. The outlet side block 12 is provided with a first bypass passage 31 which opens to an outer peripheral surface of the small diameter portion 30 at one end and which opens to the low pressure chamber 26 at the other end.

On the other hand, a step portion 41 is also formed in the outer peripheral surface of the lower portion of the second valve housing 40. A portion below the step portion 41 is formed to be a small diameter portion 42. A cylinder portion 43, which has a smaller diameter than the small diameter portion 42, extends from a bottom portion of the small diameter portion 42. The cylinder portion 43 is screwed into the small diameter portion 30 of the outlet side block 12, so the second valve housing 40 is connected to be fixed to the first valve housing 10. Note that, a gap between the small diameter portion 30 of the first valve housing 10 and the cylinder portion 43 of the second valve housing 40 is sealed by a seal ring 44.

Inside of the cylinder portion 43 of the second valve housing 40 is formed to be a valve slide hole 45. A main control valve 70 is accommodated in the valve slide hole 45 so as to be movable to vertical directions in FIG. 1. To an upper end portion of the main control valve 70, a seal ring 71 for sealing a gap between the main control valve 70 and the valve slide hole 45 is fixed. The seal ring 71 slides in the valve slide hole 45. A space surrounded by the valve slide hole 45 and the main control valve 70 constitutes a pressure chamber 46.

A gasket 72, which is seated so as to be spaced apart from the valve seat 28 of the first valve housing 10, is attached to the main control valve 70. The main control valve 70 is seated on the valve seat 28 to cut off conm2lunication between the low pressure chamber 26 and the main valve chamber 27. By being spaced apart from the valve seat 28, the main control valve 70 makes communication between the low pressure chamber 26 and the main valve chamber 27. The main control valve 70 is biased toward the valve seat 28 (downward in FIG. 1) by a coil spring 73 provided between the second valve housing 40 and the main control valve 70. The main control valve 70 is usually seated on the valve seat 28. The main control valve 70 has a communicating path 74 for communicating the main valve chamber 27 and the pressure chamber 46.

Outer diameters of the small diameter portion 30 of the first housing 10 and the small diameter portion 42 of the second valve housing 40 are the same. The sleeve 2 is fitted around the small diameter portions 30 and 42. Opposite end portions of the sleeve 2 abut on the step portion 29 of the first valve housing 10 and the step portion 41 of the second valve housing 40, respectively.

Gaps are provided between the outer peripheral surfaces of the small diameter portions 30, 42 and the inner peripheral surface of the sleeve 2. The gaps between the small diameter portions 30, 42 and the sleeve 2 are sealed by seal rings 32 and 47, respectively. Note that, the seal ring 32 is provided on a lower side of the first bypass passage 31. A portion between the seal rings 32 and 47 constitutes a third bypass passage 3.

Figure 5:
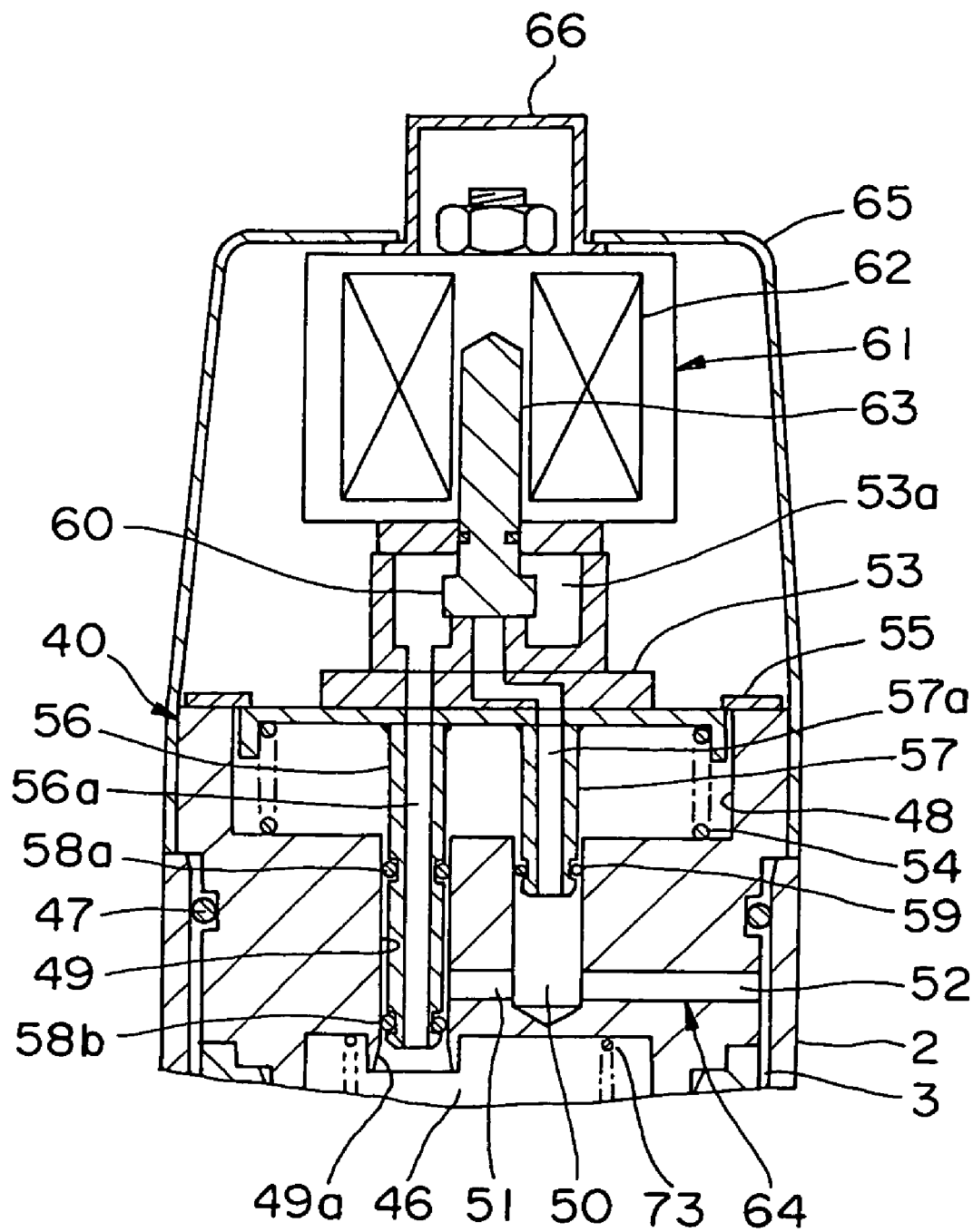
FIG. 5 is an enlarged longitudinal sectional view around a pilot valve showing a state in which a pilot valve of the flush valve device according to the embodiment is closed.
Figure 6:
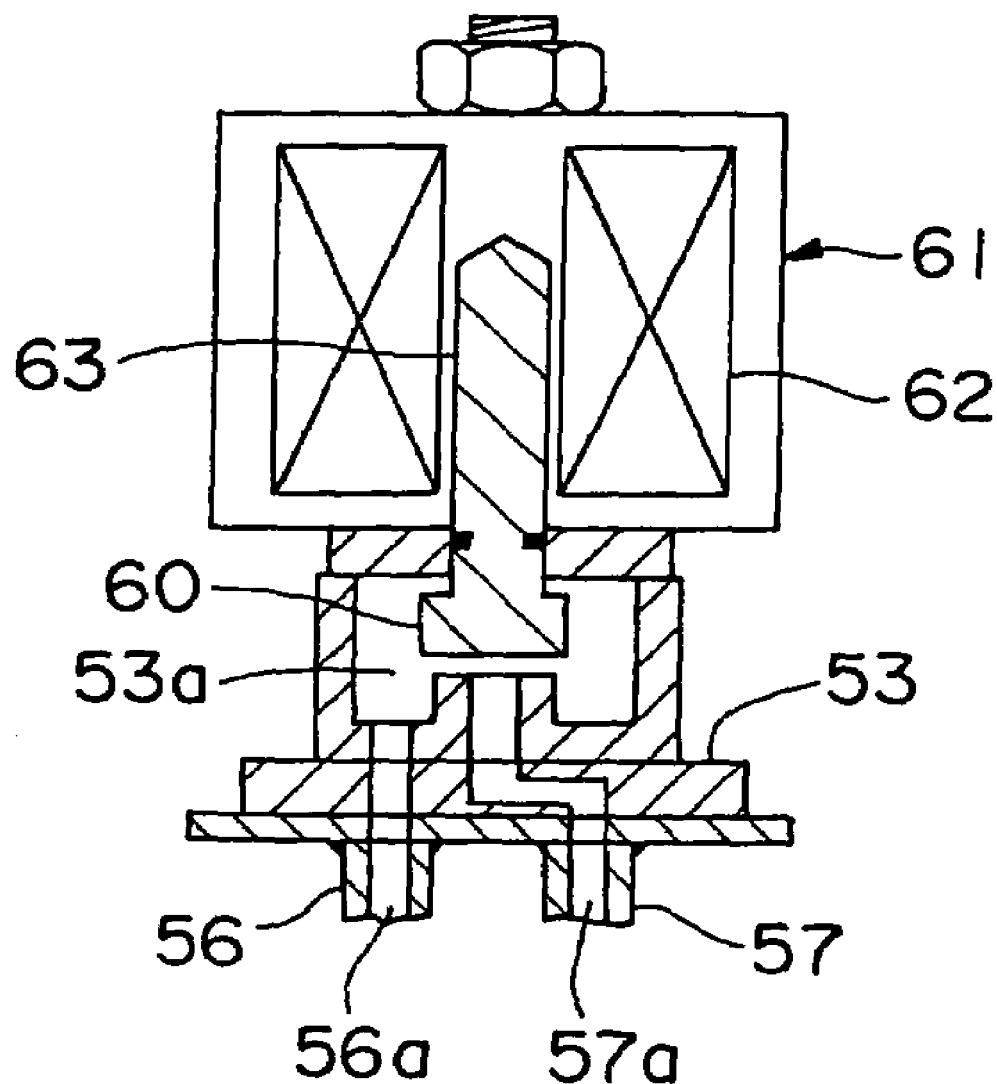
FIG. 6 is an enlarged longitudinal sectional view of a main portion around the pilot valve showing a state in which the pilot valve of the flush valve device according to the embodiment is opened.

As shown in FIG. 5, in the upper portion of the second valve housing 40, there is formed a recess 48. A through-hole 49 passing through from the recess 48 to the pressure chamber 46 and a bottomed slide hole 50 extend downwards in parallel with each other. A bottom end of the through-hole 49 constitutes a tapered hole 49a diverging downwards.

Further, the second valve housing 40 is provided with a first path 51 communicating between the through-hole 49 and the slide hole 50 and a second path 52 opening to the slide hole 50 at one end and opening to the outer peripheral surface of the small diameter portion 42 (not shown) at the other end formed therein.

Further, a movable body 53 is accommodated in the recess 48 so as to be movable toward and away from the second valve housing 40 (vertical directions in FIG. 5). The movable body 53 is biased so as to be spaced apart from the second valve housing 40 by a coil spring 54 (upward in FIG. 5). At the same time, an upper limit position of the movable body 53 is restricted by a stopper 55 fixed to the second valve housing 40.

Fixed on a lower surface of the movable body 53 are a hollow first cylinder 56 to be slidably inserted into the through-hole 49 and a hollow second cylinder 57 to be slidably inserted into the slide hole 50. There is provided, between an outer peripheral surface of the first cylinder 56 and an inner peripheral surface of the through-hole 49, a gap allowing the washing water to flow therein. A gap between the first cylinder 56 and the through-hole 49 is sealed by seal rings 58a and 58b at upper and lower portions of the through-hole 49, respectively. Further, a gap between the second cylinder 57 and the slide hole 50 is sealed by a seal ring 59.

In the movable body 53, there is formed a path 53a connecting a hollow portion 56a of the first cylinder 56 and a hollow portion 57a of the second cylinder 57. The path 53a is caused to be capable of communicating and being cut off by a pilot valve 60. Opening and closing of the pilot valve 60 is controlled by an electromagnetic drive portion 61 fixed to an upper portion of the movable body 53.

That is, the electromagnetic drive portion 61 includes a plunger 63 driven in vertical directions by a solenoid coil 62. The pilot valve 60 is provided at a tip of the plunger 63. The solenoid coil 62 is usually in a non-conducting state, at this time, the pilot valve 60 cuts off the path 53a. When the solenoid coil 62 is electrified, the plunger 63 is attracted upwards. As a result, the pilot valve 60 opens to communicate the path 53a.

Note that, in this embodiment, the tapered hole 49a, the hollow portion 56a of the first cylinder 56, the path 53a of the movable body 53, the hollow portion 57a of the second cylinder 57, the slide hole 50, and the second path 52 constitute a second bypass passage 64.

Further, to the second valve housing 40, a cover 65 for covering the movable body 53 and the electromagnetic drive portion 61 is fixed. A push button 66 fixed to a top of the electromagnetic drive portion 61 protrudes from a hole on a center of a top of the cover 65.

Next, an operation principle of the flush valve device 1 is described.

First, when the washing water is not discharged, the solenoid coil 62 of the electromagnetic drive portion 61 is in a non-conductive state, so the pilot valve 60 cuts off the path 53a in the movable body 53. Therefore, the pressure chamber 46 communicating to the main valve chamber 27 through the communication path 74 of the main control valve 70 has the same pressure as that in the main valve chamber 27. As a result, the main control valve 70 is caused to be seated on the valve seat 28 by a bias force of the coil spring 73 and a force based on a pressure difference between the low pressure chamber 26 and the main valve chamber 27 to thereby cut off the communication between the low pressure chamber 26 and the main pressure chamber 27. This state is a closing state of the flush valve device 1 in which the washing water is not discharged. Further, in this state, the check valve 15 also cuts off the inlet 13.

Subsequently, when the washing water should be discharged, the solenoid coil 62 in a conductive state, so the pilot valve 60 opens to communicate the path 53a in the movable body 53 and thus to communicate the second bypass passage 64. As a result, the pressure chamber 46 and the low pressure chamber 26 communicates with each other through the second bypass passage 64, the third bypass passage 3, and the first bypass passage 31 to causes the washing water in the pressure chamber 46 to flow to the low pressure chamber 26, and then, the pressure in the pressure chamber 46 is lowered. The force based on the pressure difference between the pressure chamber 46 and the main valve chamber 27 exceeds the bias force of the coil spring 73 and the force based on the pressure difference between the low pressure chamber 26 and the main valve chamber 27. Therefore, the main control valve 70 is pushed upwards to be spaced apart from the valve seat 28 to communicate the low pressure chamber 26 and the main valve chamber 27. As a result, the washing water in the main valve chamber 27 passes through the low pressure chamber 26, the outlet 16, and the outflow tube 17 to flow into the stool.

Further, when the pressure in the main valve chamber 27 is lowered due to the discharge of the washing water, the check valve 15 is pushed against the bias force of the coil spring 15a due to the pressure of the washing water on the inflow tube 14 side, so the check valve 15 opens. As a result, the path leading from the inlet 13 to the outlet 16 is communicated to each other, and the washing water is discharged to the stool through the path leading from the inlet 13 to the outlet 16.

At this time, the control device 100 calculates a flow rate of the washing water from the number of pulses, which is obtained from the flowmeter unit 81, by using the flow rate calculating circuit integrated in the control device. Receiving information indicating that the flow rate has reached the discharge stop flow rate at which the discharge should be stopped, the control device 100 stops energization for the solenoid coil 62 of the electromagnetic drive portion 61 owing to a function of the discharge control circuit provided in the control device 100. Accordingly, the pilot valve 60 cuts off the path 53a in the movable body 53, thereby cutting off the second bypass passage 64, so the pressure chamber 46 and the main valve chamber 27 again become equal in pressure, and the main control valve 70 is thus seated on the valve seat 28. Therefore, the low pressure chamber 26 and the main valve chamber 27 are cut off, and then, the discharge of the washing water stops. When the discharge of the washing water stops, inside the main valve chamber 27 and inside the inflow tube 14 become equal in pressure, so the check valve 15 is pressed by the bias force of the coil spring 15a to cut off the inlet 13.

Figure 7:
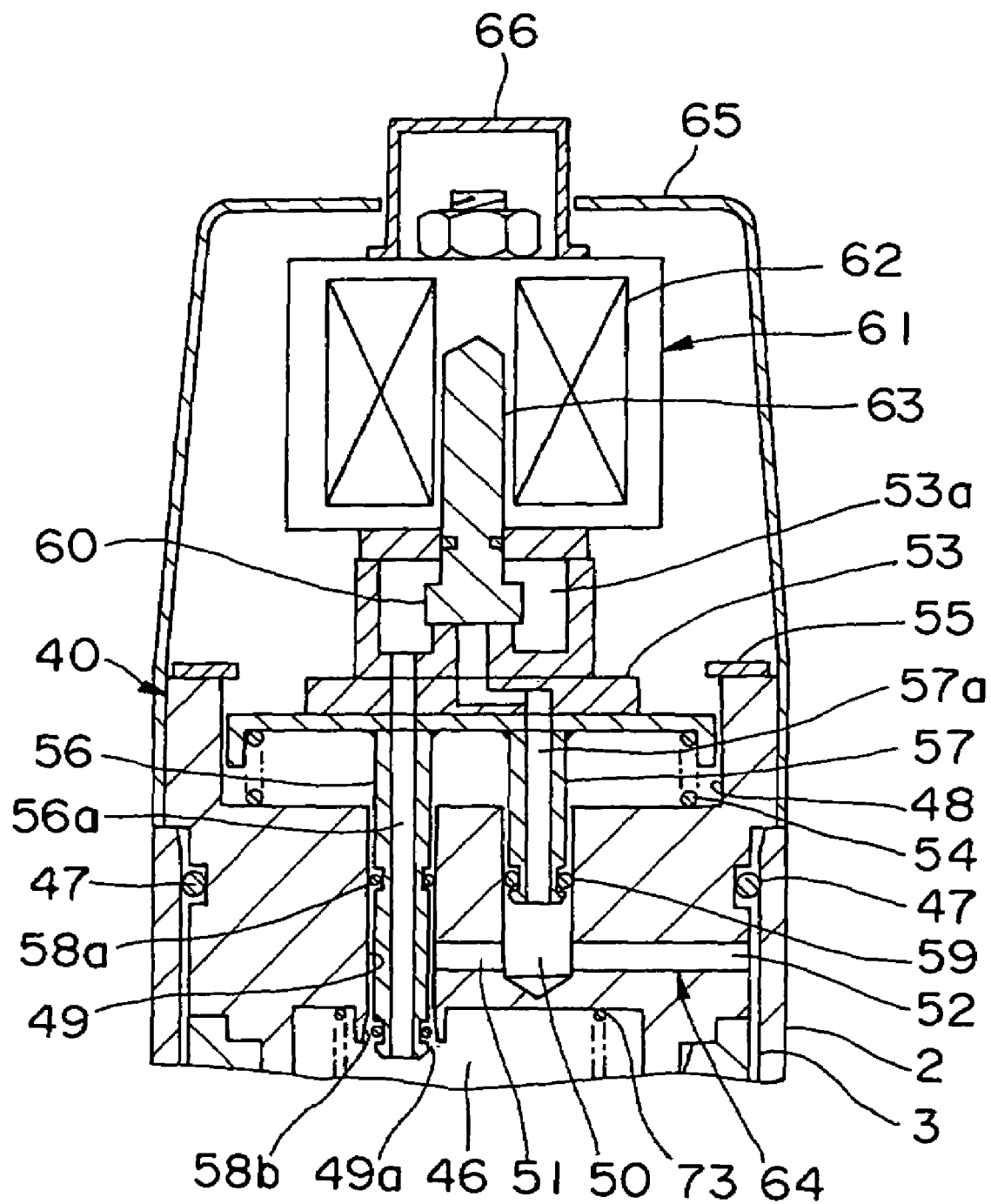
FIG. 7 is an enlarged longitudinal sectional view around the pilot valve showing a state in which the flush valve device according to the embodiment is manually opened.
Figure 8:
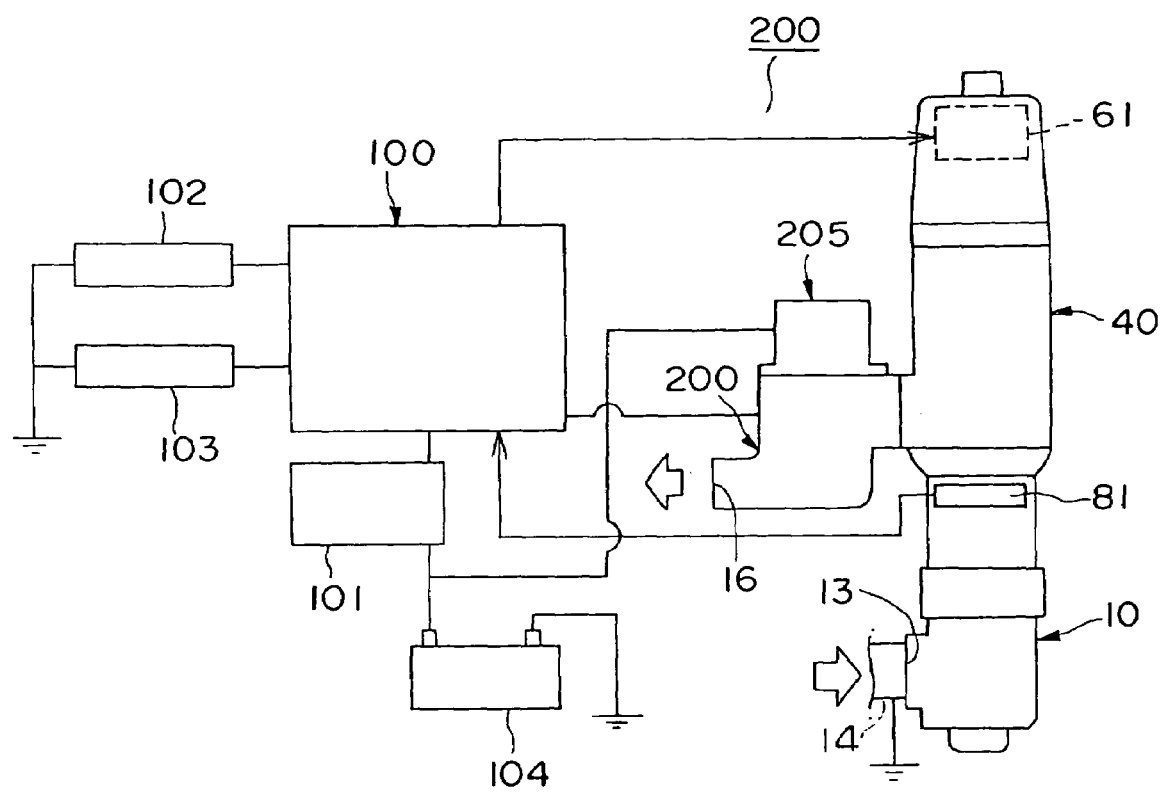
FIG. 8 is a structural view of a system of a flush valve unit according to the embodiment.

Note that, in the flush valve device 1, it is possible to manually discharge the washing water without controlling energization for the solenoid coil 62. That is, when the solenoid coil 62 is not electrified, the path 53a is cut off, but in this state, when the push button 66 is pressed downwards against the bias force of the coil spring 54, as the movable body 53 moves downwards, the first cylinder 56 and the second cylinder 57 move downwards in the through-hole 49 or the slide hole 59, respectively. As shown in FIG. 7, when the seal ring 58b on the lower side of the first cylinder 56 enters in the tapered hole 49a, the tapered hole 49a communicates with the first path 51 through the gap between the outer peripheral surface of the first cylinder 56 and the inner peripheral surface of the through-hole 49a, and further, communicates with the third bypass passage 3 through the slide hole 50 and the second path 53. As a result, the pressure chamber 46 and the low pressure chamber 26 can be communicated while the pilot valve 60 being closed. The main control valve 70 is positioned away from the valve seat 28 to communicate the main valve chamber 27 to the low pressure chamber 26, to cause the washing water to flow from the inlet 13 out to the outlet 16.

When a hand is removed from the push button 66 to spring back the movable body 53 by the coil spring 54, the seal ring 58b cuts off again the communication between the tapered hole 49a and the first path 51 to cut off the pressure chamber 46 and the low pressure chamber 26 thereby making it possible to stop the discharge of the washing water by causing the main control valve 70 to be seated on the valve seat 28.

Subsequently, the control device 100 described above is described with reference to FIGS. 8 through 12.

The control device 100 includes the flow rate calculating circuit and the discharge control circuit required for controlling the solenoid coil 62 provided in the electromagnetic drive portion 61, the water leakage monitoring circuit for monitoring water leakage in the path leading from the inlet 13 to the outlet 16, the monitoring circuit for monitoring the operation failure of the flowmeter unit 81 and the electricity generating unit 205, and the theft-prevention circuit for preventing the flush valve device 1 from being stolen.

Further, the flush valve device 1 described in this embodiment generates electricity as described above in the electricity generating unit 205 provided in the external housing 200 forming the path leading from the first valve housing 10 to the outlet 16. By supplying at least a part of the electricity generated as described above to the control device 100 through the inverter 101, the flush valve device 1 compensates for the electricity consumed by the control device 100. In addition, when a battery 104 is provided in the circuit electrically connecting the electricity generating unit 205 and the control device 100, and even in a non-discharge state in which the electricity generation is stopped, various controls are performed in the control device 100 by using the electricity stored in the battery 104.

First, the water leakage monitoring circuit is composed of a first water leakage monitoring circuit and a second water leakage monitoring circuit. The control device 100 receives information indicating that at least one of the water leakage monitoring circuits detects an occurrence of the water leakage, and, for example, lights up a water leakage alerting indicator on an indicator panel 102 provided to the control device 100.

Figure 9:
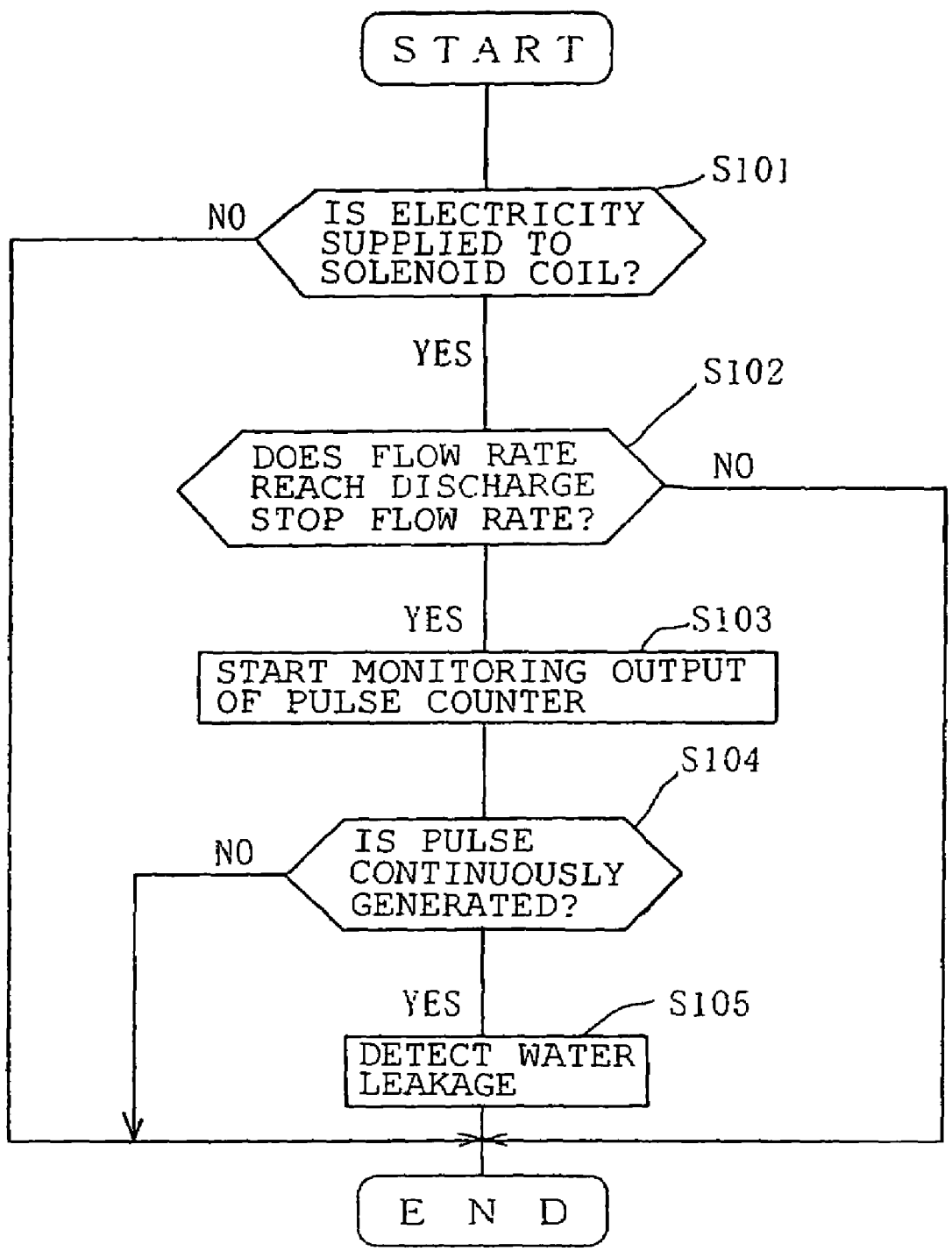
FIG. 9 is a flow chart showing processing contents of a control program to be processed in a first water leakage monitoring circuit according to the embodiment.
Figure 10:
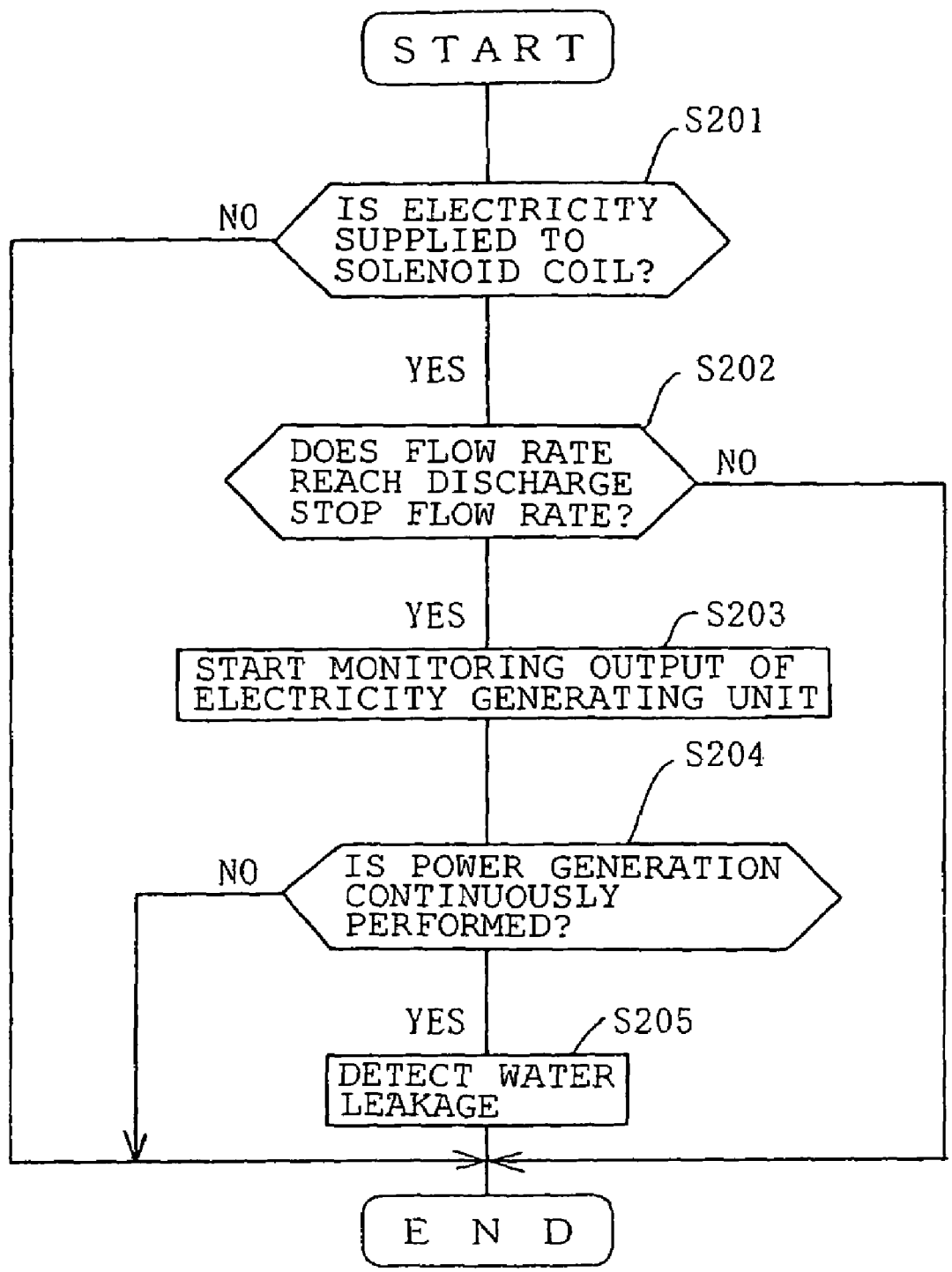
FIG. 10 is a flow chart showing processing contents of a control program to be processed in a second water leakage monitoring circuit according to the embodiment.

FIG. 9 is a flow chart showing processing contents of a control program to be processed in the first water leakage monitoring circuit. FIG. 10 is a flow chart showing processing contents of a control program to be processed in the second water leakage monitoring circuit.

First, as shown in FIG. 9, in the first water leakage monitoring circuit, after the solenoid coil 62 is electrified (Step S101), information indicating that the flow rate calculated in the flow rate detecting circuit reaches the discharge stop flow rate is received (Step S102), the output of the pulse counter 85 is monitored (Step S103), after the discharge is stopped, information indicating that the pulses are continuously generated on the pulse counter 85 is received (Step S104), and the occurrence of the water leakage on the downstream side of the flowmeter unit 81 is detected (Step S105).

Further, as shown in FIG. 10, in the second water leakage monitoring circuit, after the solenoid coil 62 is electrified (Step S201), information indicating that the flow rate calculated in the flow rate detecting circuit reaches the discharge stop flow rate is received (Step S202), presence/absence of the electricity generation by the electricity generating unit 205 is monitored (Step S203), after the discharge is stopped, information indicating that the electricity generation is continuously performed in the electricity generating unit 205 is received (Step S204), and the occurrence of the water leakage on the upstream side of the main control valve 70 is detected (Step S205).

That is, in those water leakage circuits, by monitoring values on the pulse counter 85 and the presence/absence of the electricity generation in the electricity generating unit 205 after the discharge is stopped as a parameter for the water leakage detection, presence/absence of the water leakage is grasped.

Accordingly, in maintaining the flush valve device 1, for example, by checking the indicator which lights up in response to the finding of the water leakage in the water leakage monitoring circuit, it is possible to grasp the water leakage in the upstream side of the main control valve 70 without disassembling the flush valve device 1.

Next, various monitoring circuits for monitoring the operation failure of the flowmeter unit 81 and the electricity generating unit 205 is described in detail.

Figure 11:
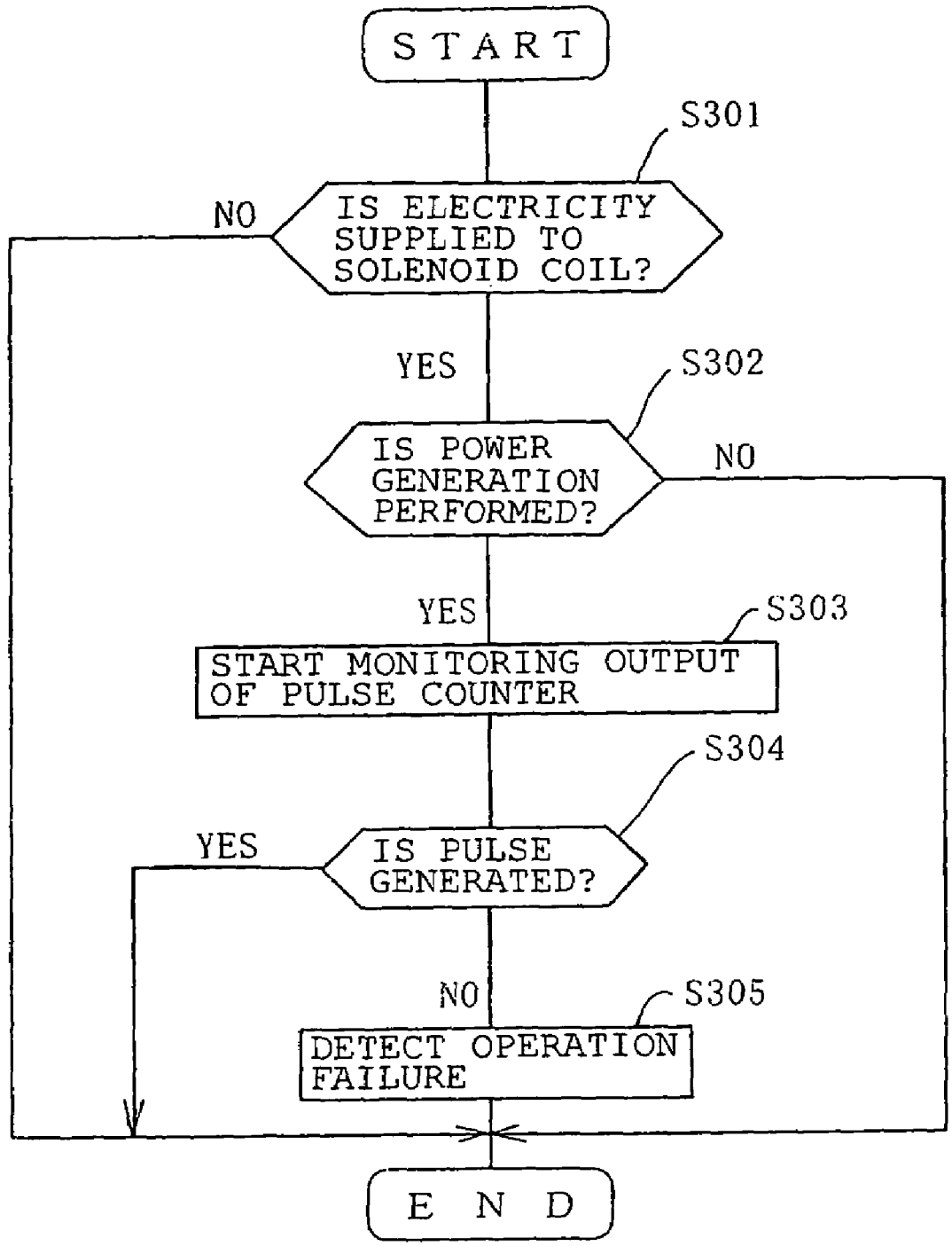
FIG. 11 is a flow chart showing processing contents of a control program executed in a monitoring circuit monitoring an operation failure of the flowmeter unit according to the embodiment.
Figure 12:
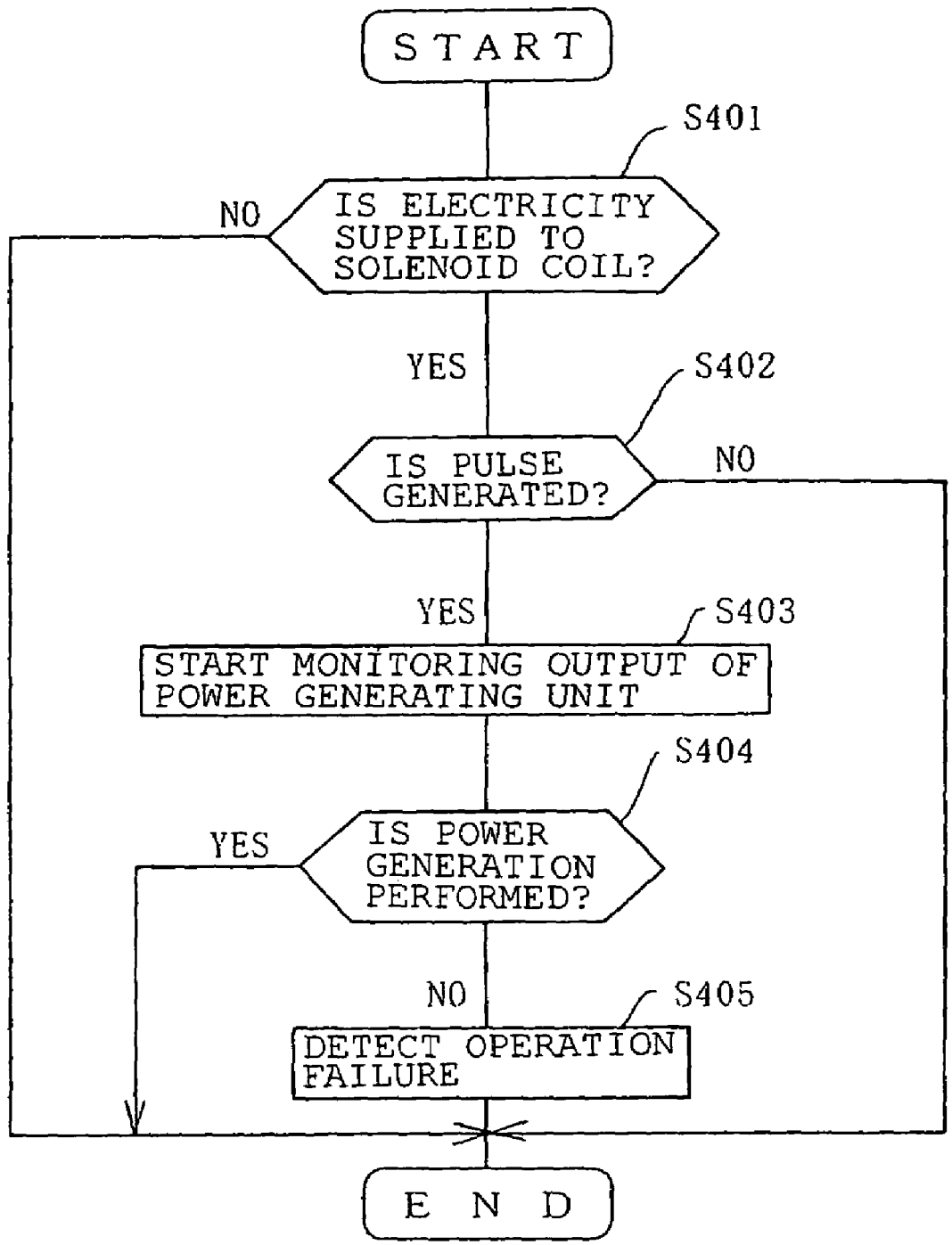
FIG. 12 is a flow chart showing processing contents of a control program executed in a monitoring circuit monitoring an operation failure of an electricity generating unit according to the embodiment.

Note that, FIG. 11 shows various processings performed in a monitoring circuit for the flowmeter unit 81, for monitoring the operation failure of the flowmeter unit 81. Further, FIG. 12 shows various processings performed in a monitoring circuit for the electricity generating unit 205, for monitoring the operation failure of the electricity generating unit 205. Further, on the indicator panel 102 of the control device 100, an alert indicator for the flowmeter unit 81 and an alert indicator for the electricity generating unit 205 are provided, in the same manner as the water leakage alerting indicator. The control device 100 lights up the indicator in response to the detection of the operation failure of the flowmeter unit 81 and the electricity generating unit 205.

As shown in FIG. 11, in the monitoring circuit for the flowmeter unit 81, after the solenoid coil 62 is electrified (Step S301), firstly, whether or not electricity generation is performed in the electricity generating unit 205 is detected (Step S302), then, after the electricity generation is started, the output of the pulse counter 85 is monitored (Step S303), and when no pulse is generated yet in the pulse counter 85 although the electricity generation is performed in the electricity generating unit 205 (Step S304), an operation failure of the flowmeter unit 81 is detected (Step S305).

That is, in the monitoring circuit for the flowmeter unit 81, the electricity generating unit 205 is in an electricity generating state, and an operation failure of the flowmeter unit 81 is detected in response to information indicating that a discharge of the washing water is not detected in the flowmeter unit 81.

On the other hand, as shown in FIG. 12, in the monitoring circuit for the electricity generating unit 205, after the solenoid coil 62 is electrified (Step S41), firstly, whether or not pulses are emitted from the pulse counter 85 (Step S402), then, after the pulse is obtained, an electricity generating state of the electricity generating unit 205 is monitored (Step S403), and when the electricity generation is not performed yet while pulses are generated in the pulse counter 85 (Step S404), an operation failure of the electricity generating unit 205 is detected (Step S405).

That is, in the monitoring circuit for the electricity generating unit 205, a flow of the washing water is detected in the flowmeter unit 81. In response to information indicating that the electricity generating unit 205 is not in the electricity generating state, an operation failure of the electricity generating unit 205 is detected.

Next, the theft-prevention circuit for the flush valve device 1 is described.

First, before a description is made of the theft-prevention circuit, it is to be noted that the first valve housing 10, the second valve housing 40, the exterior housing 200, and the like are composed of sufficiently conductive castings, and they are grounded at the inflow tube 14 connected to the inlet side cut off 11 of the first valve housing 10.

On the other hand, in the theft-prevention circuit, a ground circuit is formed, which includes various housings having conductivity as a part of the circuit. In order to detect cutting off of the ground circuit, a weak electricity used for monitoring a circuit cutting off is supplied to the ground circuit. Further, the theft-prevention circuit is provided with a buzzer 103 for sounding an alert. In the theft-prevention circuit, the buzzer 103 sounds in response to a change in resistance of the ground circuit.

To be more specific, when the various housings are removed from an existing piping to which the various housings are installed, the ground circuit is electrically cut off, thereby causing the resistance of the ground circuit to reach infinity. Thus, in the theft-prevention circuit, in response to the change in resistance, disassembly and removal of various housings are sensed, and then the buzzer 103 sounds, thereby preventing the flush valve device 1 from being stolen.

As described above, in this embodiment, there is provided the flush valve device 1 including the main control valve (control valve) 70 arranged in the path leading from the inlet 13 to the outlet 16, the flowmeter unit 81 for outputting the presence/absence of the flow of the washing water flowing from the inlet 13 to the outlet 16 in the form of a pulse signal, and the control device 100 for controlling the opening and closing of the main control valve 70 based on the output of the flowmeter unit 81, in which the flush valve device 1 is provided with the electricity generating unit 205 for generating electricity by using flow of the washing water as its power, and at least a part of the electricity obtained in the electricity generating unit 205 is supplied to the control device 100. That is, the flush valve device 1 according to this embodiment supplies the electricity generated by itself to the control device 100 to substantially suppress electricity consumption.

Further, the flush valve device 1 includes the battery 104 for charging at least a part of the electricity obtained in the electricity generating unit 205, so a part of the generated electricity is stored in the battery 104. Therefore, even in the non-discharge period in which the electricity generation is stopped, by using the electricity stored in the battery 104, it is possible, for example, to ensure a power source for the theft-prevention circuit even in the non-discharge period. Further, an external power source is substantially unnecessary, so in installing the flush valve device 1, a power distribution work becomes simple. As a result, it is possible to increase a construction property.

As described above, the control device 100 is provided with the water leakage monitoring circuit for monitoring the water leakage in the path leading to the outlet 16, so in maintaining after the installation, by grasping information obtained by the water leakage monitoring circuit in the form of lighting of the water leakage alerting indicator 102 or the like, it is possible, for example, to easily grasp the presence/absence of the water leakage following to the deterioration with time of the main control valve 70 or the like.

Further, the control device 100 is provided with various monitoring circuits for monitoring an operation failure of the flowmeter unit 81 and an operation failure of the electricity generating unit 205, so in maintaining after the installation, by grasping information obtained by the monitoring circuits, in the form of, for example, lighting of the indicator of the control device 100, it is possible to easily grasp the operation failure of the flowmeter unit 81 following to its deterioration with time or the like and the operation failure of the electricity generating unit 205 following to its deterioration with time or the like.

Further, the control device 100 is provided with the theft-prevention circuit having various housings mounted in the flush valve device 1 as a part of the circuit, for issuing an alert in response to the cutting off of the circuit. Therefore, when, for example, the first valve housing is removed from the existing piping, it is possible to issue an alert due to a function of the theft-prevention circuit. Accordingly, it is possible to prevent the flush valve device 1 from being stolen or the like.

Note that, the above embodiment is merely one embodiment of the present invention, and details thereof can be modified in accordance with various specifications.

For example, in the above embodiment, the flowmeter unit 81 and the electricity generating unit 205 are provided separately. However, the rotating impeller 83 provided in the flowmeter unit 81 and the impeller 201 provided in the electricity generating unit 205 may be common members, to rotate the electricity generating rotor in the electricity generating unit 205.

Further, in the above embodiment, the electricity generating unit 205 is provided on the downstream side of the flowmeter unit 81. Conversely, for example, the electricity generating unit 205 may be provided on the upstream side of the flowmeter unit 81. That is, the mounting position of the electricity generating unit 205 can be appropriately modified in accordance with various specifications, installation space, or the like of the flush valve device 1.

Further, when the electricity generating unit 205 is provided on the upstream side of the flowmeter unit 81, it is possible to detect a local water leakage in, for example, the path leading from the electricity generating unit 205 to the flowmeter unit 81 in response to information indicating that the electricity generation is performed when flow of the washing water is not detected.

Figure 13:
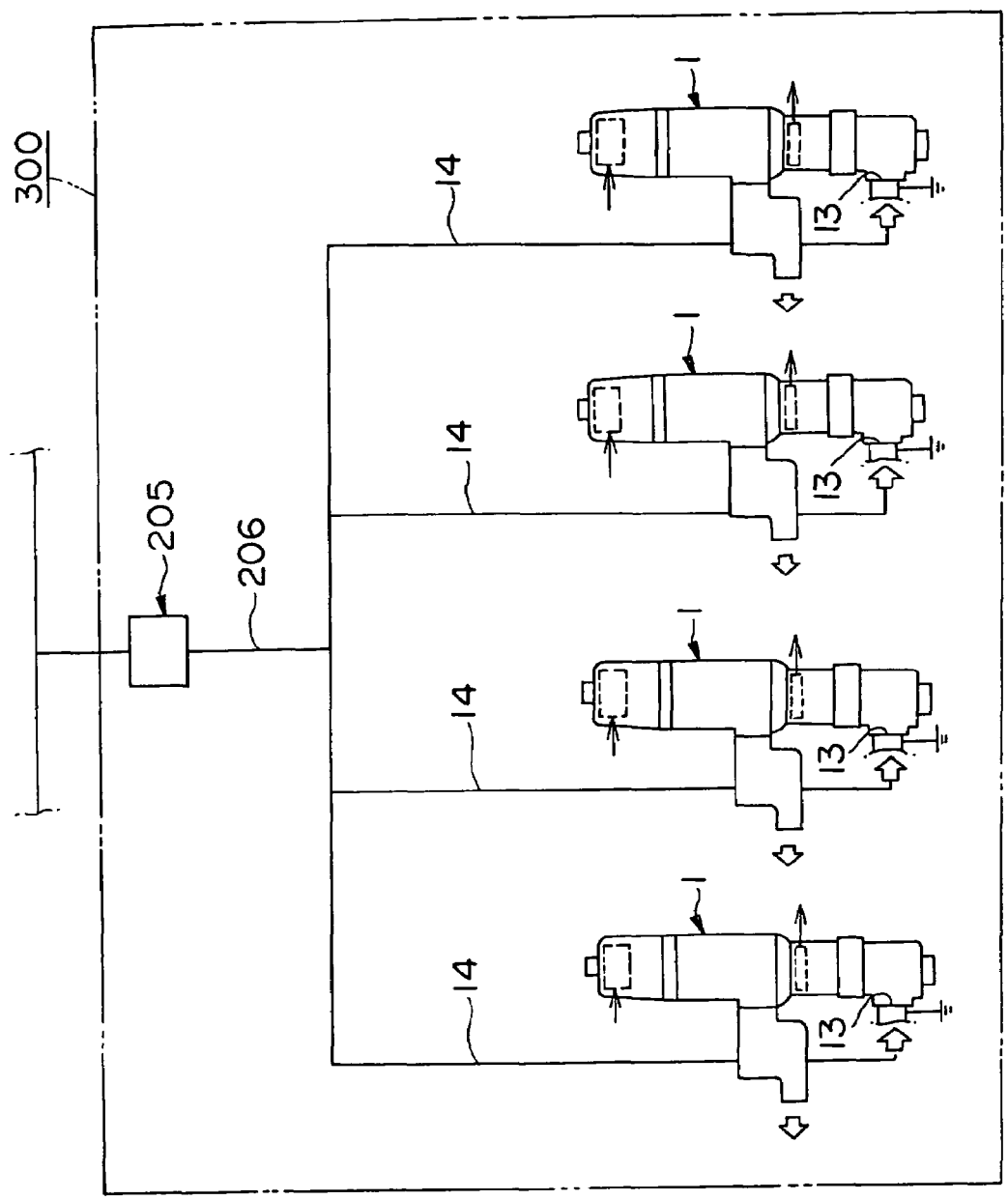
FIG. 13 is a structural view of a system of a flush valve unit including a plurality of flush valve devices according to the embodiment.
Figure 14:
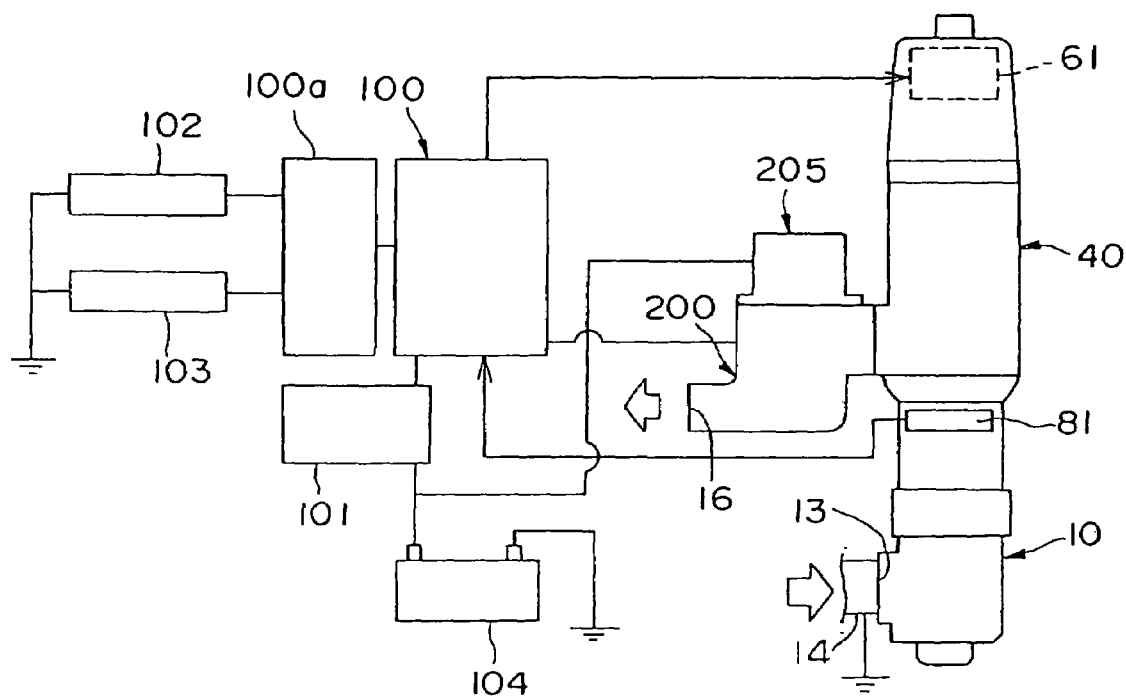
FIG. 14 is a structural view of a system of a flow rate control valve according to another embodiment of the present invention.

Further, in the above embodiment, the electricity generating unit 205 is provided on the external housing 200 of the flush valve device 1, but it is not restricted. For example, as shown in FIG. 13, the flush valve unit 300 having a plurality of flush valve devices 1 is considered to have a structure in which the inflow tubes 14 extending from the inlets 13 of the flush valve devices 1 are connected to a common water supply pipe 206, and the electricity generating unit 205 is provided on the water supply pipe 206 side.

With this construction, any of the plurality of flush valve devices 1 is in the discharge state, due to the discharge, the washing water flows through the water supply pipe 206, so the electricity generation is performed in the electricity generating unit 205 provided on the water supply pipe 206 side. Accordingly, even when any flush valve device 1 is in the non-discharge state, due to the electricity generation owing to the discharge of the other flush valve devices 1, the electricity to be supplied to the flush valve device 1 in the non-discharge state can be compensated.

As described above, various constructions described in this embodiment can be appropriately modified.

Next, another embodiment of the present invention is described with reference to the drawings.

Also in this embodiment, a description is made by taking, as an example, a flow control device (hereinafter, referred to as flush valve device) having a flush valve as a water stop valve for a stool. Note that, a flush valve device 1 and the like of this embodiment are the same in construction as those of the embodiment described above except for a newly described construction, so the description thereof is omitted.

With reference to FIGS. 14 through 17, a control device 100 according to this embodiment is described.

The control device 100 includes a flow rate calculating circuit and a discharge control circuit required for controlling the solenoid coil 62 provided in the electromagnetic drive portion 61, a flow rate difference calculating circuit for calculating over and short of the flow rate, and an adjustment circuit for adjusting a flow rate of water to be discharged based on the flow rate calculated in the flow rate difference calculating circuit. Further, the control device 100 is provided with an output portion 100a for outputting the flow rate calculated in the flow rate calculating circuit to the outside the control device 100.

Further, the output portion 100a is connected to a flow rate counter 102 for displaying a flow rate to be outputted per discharge of the washing water together with date and time and the like of the discharge, an indicator 103 for informing an operation failure of the flush valve device 1, and the like.

Figure 15:
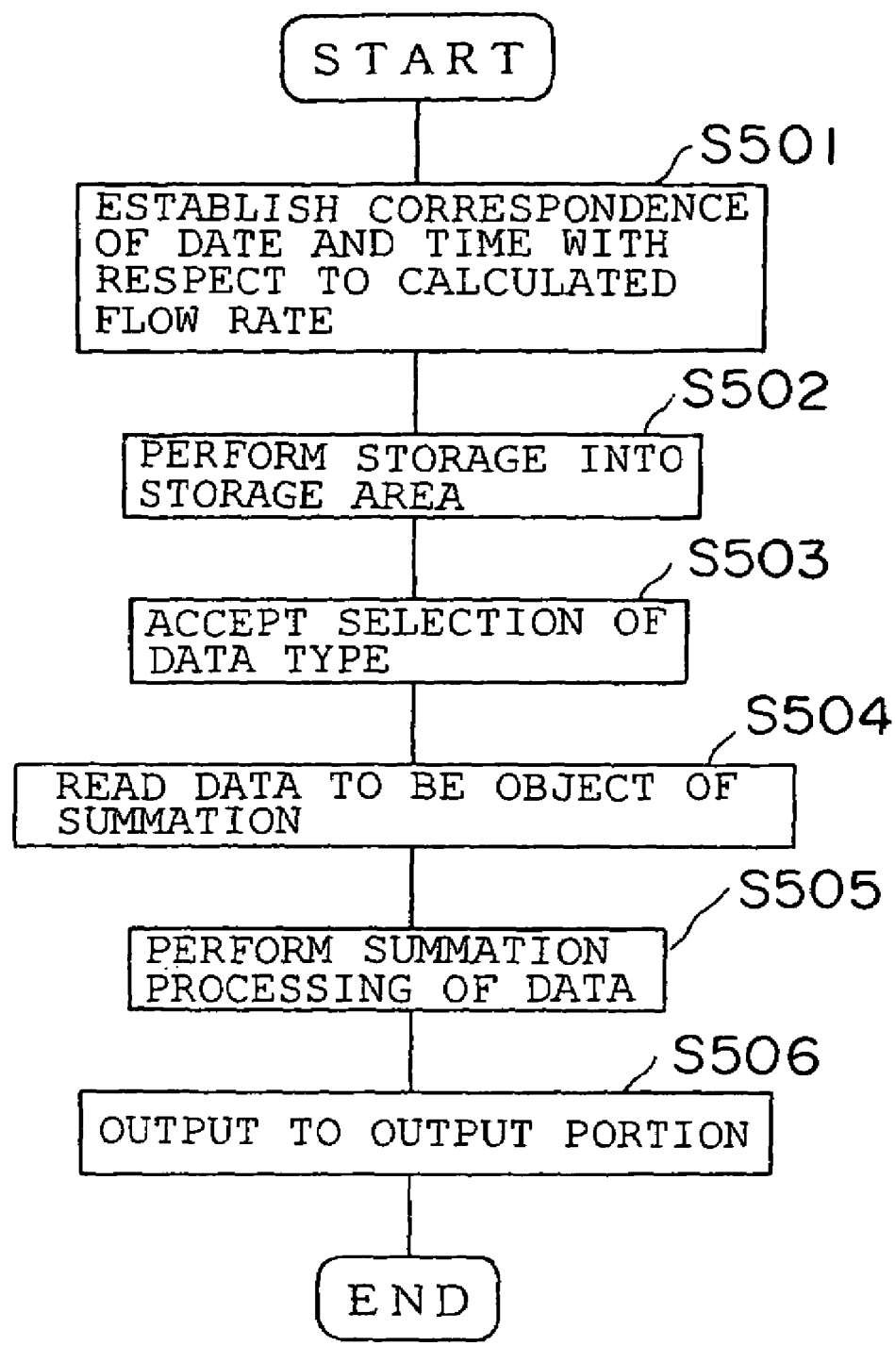
FIG. 15 is a flowchart showing processing contents of a control program to be processed when displaying a flow rate for a flow rate counter according to another embodiment.
Figure 16:
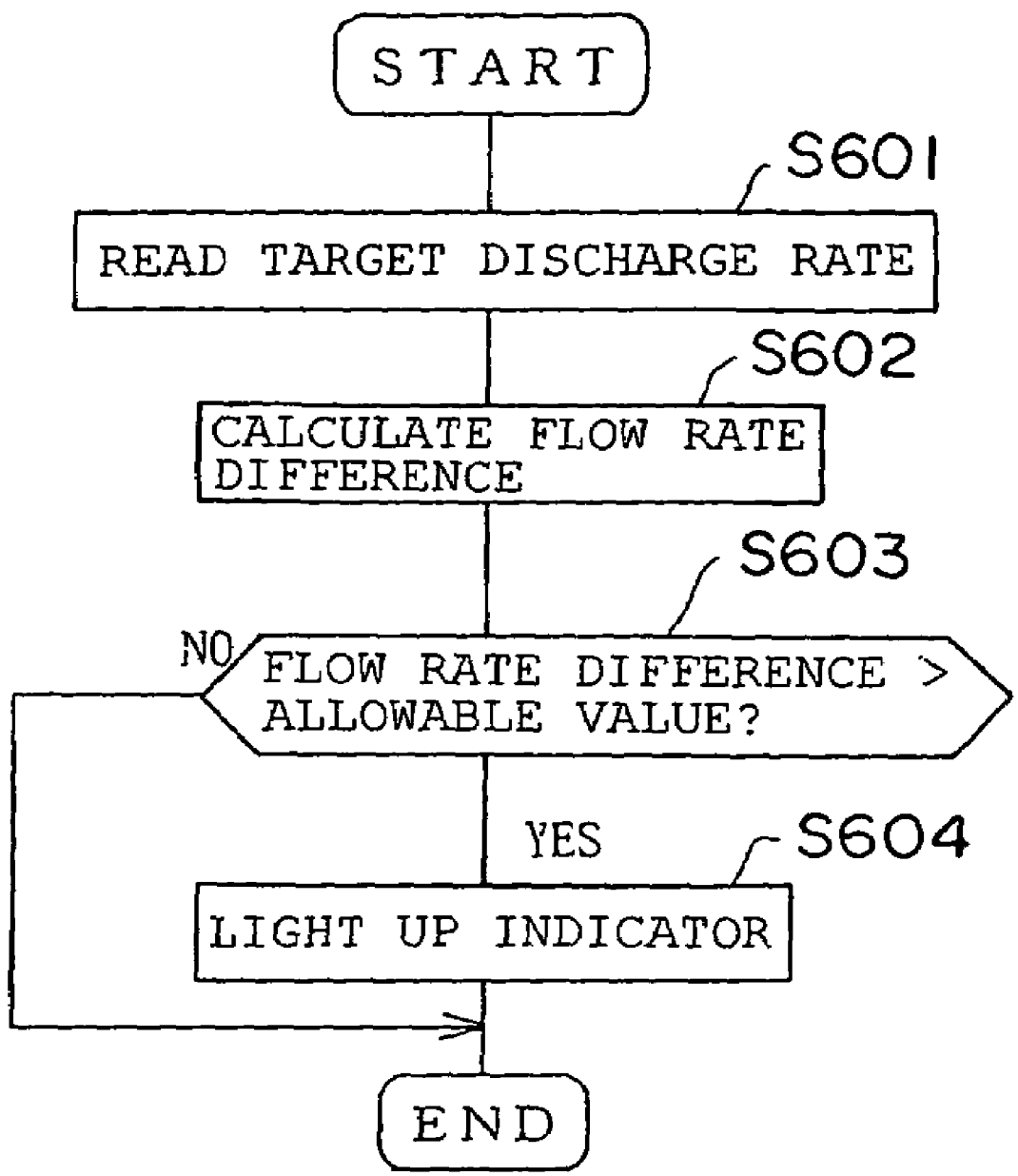
FIG. 16 is a flowchart showing processing contents of a control program to be processed when informing an operation failure of a flush valve device according to another embodiment.
Figure 17:
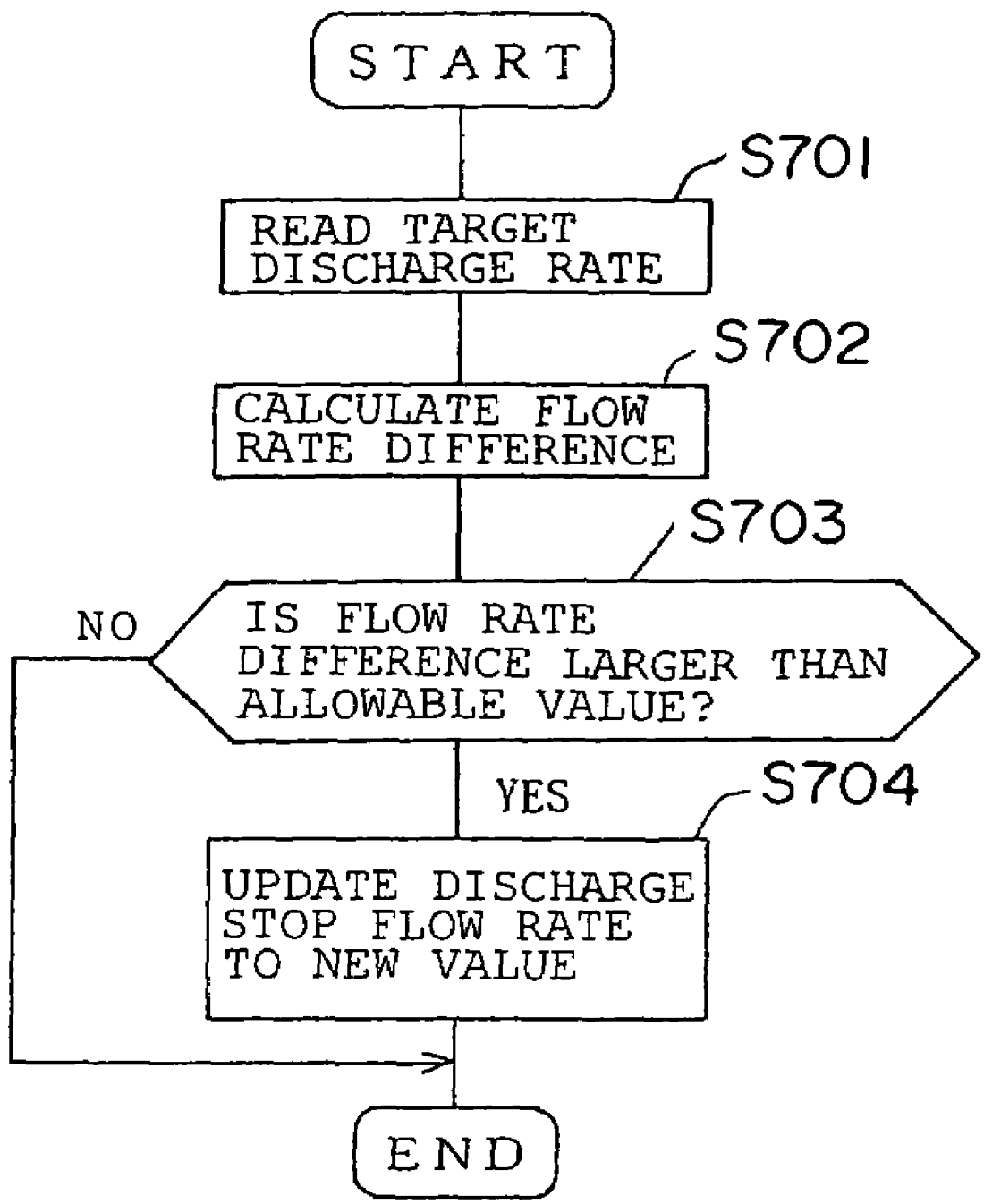
FIG. 17 is a flowchart showing processing contents of a control program executed in a control device when adjusting a flow rate of water to be discharged according to another embodiment.

Note that, FIG. 15 is a flow chart showing processing contents of a control program executed in the control device 100 when displaying on the flow rate counter 102. Further, FIG. 16 is a flowchart showing processing contents of a control program to be processed when informing an operation failure of the flush valve device 1. Further, FIG. 17 is a flow chart showing processing contents of a control program executed in the control device 100 when adjusting a flow rate of water to be discharged.

As shown in FIG. 15, when displaying the flow rate on the flow rate counter 102, first, a flow rate to be outputted and date and time of the discharge involving the output are related to each other in correspondence (Step S501), the flow rate corresponding to the date and time is temporarily stored in a storage area in the control device 100 (Step S502). Next, in order to select a data type to be outputted to the output portion 100a, the control device 100 is subjected to an operation on an operation panel provided to the control device 100 (Step S503). Note that, in this embodiment, as a type of the data to be outputted, cumulative data of the washing water which is discharged within a unit period, flow rate data discharged within a discharge, and the like can be selected.

For example, when the output of the summation of the washing water discharged within the unit period is demanded, of the data stored in the storage area of the control device 100, data corresponding to the date and time to be the object of summation is read out (Step S504), and the control device 100 sums up the read data (flow rate) (Step S505) to output the resultant to the output portion 100a (Step S506).

As shown in FIG. 16, in order to inform the operation failure of the flush valve device 1, first, a target discharge rate is read out from the storage area of the control device 100 (Step S601), and the flow rate difference is calculated by comparing the calculated flow rate and a predetermined target discharge rate (Step S602). Further, by comparing the calculated flow rate difference and an allowable value (error flow rate) to be allowed (Step S603), when the calculated flow rate difference exceeds the allowable value, the indicator 103 provided to the 100a lights up to inform an operation failure of the flush valve device 1 (Step S604).

Note that, here, the predetermined target discharge rate varies in accordance with various specifications. For example, the target discharge rate may be the discharge stop flow rate of water involved in one discharge. Further, it may be a flow rate of water consumed within plural times of discharge, as long as it is data comparable to the data related to the flow rate obtained as a sample for an arbitrary period.

Further, in correcting a flow rate of water to be discharged as shown in FIG. 17, first, the target discharge rate is read out from the storage area of the control device 100 (Step S701), and the calculated flow rate and the predetermined target discharge rate are compared to calculate the flow rate difference thereof (Step S702). Further, the calculated flow rate difference and the allowable value (error flow rate) to be allowed are compared to each other (Step S703). When the calculated flow rate difference exceeds the allowable value, the predetermined target discharge rate for control, for example, is updated to a new value in order to adjust the flow rate of water to be discharged (Step S704).

As described above, the flow rate control valve according to this embodiment includes the output portion 100a for outputting the calculated flow rate to the outside. Thus, in maintaining the flow rate control valve, the flow rate outputted to the output portion 100a is grasped with reference to the flow rate counter 102 provided to the output portion 100a, thereby making it possible to utilize the calculated flow rate for a maintenance of the flow rate control valve.

Further, according to this embodiment, the flow rate to be outputted is stored in correspondence with the time or date of the discharge involving the output, so in outputting the flow rate, it is possible not only to grasp the flow rate, but also to obtain accurate information due to the correspondence between the flow rate to be outputted and the date and time or the like.

Further, the output portion 100a can also sum up the flow rate of the fluid discharged within a unit period to output the resultant. Therefore, in grasping the flow rate, it is possible to grasp the flow rate of the fluid discharged within the unit period by assuming, for example, the time of a week or day as a unit. Thus, it is possible to accurately grasp a day of week, a time zone, and the like in which the discharge rate increases.

Further, the output portion 100a includes an indicator 103 for informing that there are over and short in flow rate of the fluid discharged if there is any. Therefore, it is possible to easily grasp the over and short of the fluid involved in the discharge.

Further, the control device 100 includes the flow rate difference calculating circuit for calculating the over and short of the fluid by comparing the calculated flow rate and the predetermined target discharge rate, and the adjustment circuit for adjusting the flow rate of water to be discharged based on the flow rate calculated in the flow rate difference calculating circuit. Therefore, the flow rate control valve can perform a discharge of appropriate amount of the fluid even if there occurs some problem.

The above embodiment is merely one embodiment, and the details thereof can be appropriately modified according to various modifications.

For example, as shown in FIG. 13, in terms of the construction in which the inflow tubes 14 extending from the inlets 13 of the respective flush valve devices 1 are connected to the common water supply pipe 206, a construction is conceivable in which the flow rate is outputted for every flush valve device 1, the flow rates of the flush valve devices 1 are summed to be outputted, or the like.

Further, in the above embodiment, a numeric value such as the discharge stop flow rate is adopted as the target discharge, but it is not obligatory. For example, a construction is conceivable in which the flow rate discharged within plural times of discharge is taken as an object to determine the flow rate difference. To be more specific, the flow rate difference can be determined through comparison between the flow rate of water consumed within 10 times of discharge (discharge stop flow rate * 10 times) and the flow rate of water actually consumed within the 10 times of discharge (cumulative data).

Further, in this embodiment, the description is made by taking the flush valve device 1 provided in the stool as an example. However, this construction can also surely be adopted into a flush valve device provided to a wash stand or the like. Further, as a function of counting/displaying the flow rate, it is possible to count/display flow rates of a main flow rate control valve and a typical automatic water tap provided to a wash stand or the like altogether and also individually. Further, the flow rate control valve constructed as described above can be retrofitted to existing facilities. Thus, the flow rate control valve can also be newly provided after completion of building, for example, even to water sections such as public toilets and offices which only have water meters provided to the water supply main pipe.

As described above, various constructions of this embodiment can be appropriately modified.

The invention claimed is:

1. A flow control device comprising:
a flush valve device having a control valve in a path leading from an inflow opening to an outflow opening;
a detection portion for outputting presence/absence of a flow of a fluid flowing from the inflow opening to the outflow opening by converting to an electric signal;
an electricity generating device for generating electricity by using the flow of the fluid as power; and
a control device for controlling opening and closing of the control valve based on the output of the detection portion, said control device comprising:
a water leakage monitoring circuit for monitoring a water leakage in the path leading to the outflow opening,
a flow rate calculating circuit for calculating a flow rate of a fluid, which is discharged through the outflow opening, based on the electric signal obtained in the detection portion, and
a discharge control circuit for closing the control valve in response to information indicating that the flow rate reaches a discharge stop flow rate at which a discharge should be stopped;
wherein at least a part of the electricity obtained in the electricity generating device is supplied to the control device; and
wherein the water leakage monitoring circuit detects a water leakage in response to information indicating that an electricity generation is continuously performed in the electricity generating device after the flow rate has reached the discharge stop flow rate.

2. A flow control device comprising:
a flush valve device having a control valve in a path leading from an inflow opening to an outflow opening;
a detection portion for outputting presence/absence of a flow of a fluid flowing from the inflow opening to the outflow opening by converting to an electric signal;
an electricity generating device for generating electricity by using the flow of the fluid as power; and
a control device for controlling opening and closing of the control valve based on the output of the detection portion, said control device comprising a detection monitoring circuit for monitoring an operation failure of the detection portion;
wherein at least a part of the electricity obtained in the electricity generating device is supplied to the control device; and
wherein the detection monitoring circuit detects the operation failure of the detection portion in response to information indicating that the electricity generating device is in an electricity generating state and the flow of the fluid is not detected in the detection portion.

3. A flow control device comprising:
a flush valve device having a control valve in a path leading from an inflow opening to an outflow opening;
a detection portion for outputting presence/absence of a flow of a fluid flowing from the inflow opening to the outflow opening by converting to an electric signal;
an electricity generating device for generating electricity by using the flow of the fluid as power; and a control device for controlling opening and closing of the control valve based on the output of the detection portion, said control device comprising
    an electricity generation monitoring circuit for monitoring an operation failure of the electricity generating device;
wherein at least a part of the electricity obtained in the electricity generating device is supplied to the control device; and
wherein the electricity generation monitoring circuit detects the operation failure of the electricity generating device in response to information indicating that the flow of the fluid is detected in the detection portion and the electricity generating device is not in an electricity generating state.

4. A flow control device according to any one of claims 1 to 3, comprising a capacitor for storing at least a part of the electricity obtained in the electricity generating device.

5. A flow control device according to claim 2 or 3, wherein the control device comprises a water leakage monitoring circuit for monitoring a water leakage in the path leading to the outflow opening.

6. A flow control device according to claim 5, wherein:
the control device comprises: a flow rate calculating circuit for calculating a flow rate of a fluid, which is discharged through the outflow opening, based on the electric signal obtained in the detection portion; and a discharge control circuit for closing the control valve in response to information indicating that the flow rate reaches a discharge stop flow rate at which a discharge should be stopped; and
the water leakage monitoring circuit judges an occurrence of the water leakage in response to information indicating that a flow of a fluid is continuously detected in the detection portion after the flow rate reaches the discharge stop flow rate.

7. A flow control device according to any one of claims 1 to 3, wherein:
the path leading from the inflow opening to the outflow opening is composed of a conductive valve housing; and
the control device comprises a theft-prevention circuit, which includes the conductive valve housing as a part of the circuit, for issuing an alert in response to a cut off of the circuit.

8. A flow control device according to any one of claims 1 to 3, wherein:
the detection portion comprises a rotating impeller, which is arranged in the path leading from the inflow opening to the outflow opening, for rotating when receiving the flow of the fluid; and
the electricity generating device comprises an electricity generating body for rotating with the rotating impeller.

9. A flow control device according to any one of claims 1 to 3, wherein: the flow control device comprises a plurality of flush valve devices; the flush valve devices include inflow openings connected to a common water supply pipe; and the electricity generating device is provided on the water supply pipe side.

10. A flow control device according to any one of claims 2 to 3, wherein:
the flow control device comprises a flow rate calculating portion for calculating a flow rate of a fluid, which is discharged through the outflow opening, based on an electric signal obtained in the detection portion;
the control device controls opening and closing of the control valve based on whether or not the flow rate calculated in the flow rate calculating portion reaches a discharge stop flow rate at which a discharge should be stopped; and
the flow control device comprises an output portion for outputting the flow rate calculated in the flow rate calculating portion to an outside of the flow rate calculating portion.

11. A flow control device according to claim 10, characterized in that the output portion comprises a display device for displaying the outputted flow rate.

12. A flow control device according to claim 10, characterized by comprising a storage portion for storing the flow rate to be outputted to the output portion, and a time or date on which a discharge involving the output is performed are stored in correspondence with each other.

13. A flow control device according to claim 10, characterized in that the output portion sums up and outputs flow rates of a fluid discharged within a unit period.

14. A flow control device according to claim 10, characterized in that the flow rate calculating portion comprises:
a flow rate difference calculating circuit for calculating over and short of the calculated flow rate by comparing the calculated flow rate with a predetermined target discharge rate; and an adjustment circuit for adjusting a flow rate to be discharged, based on the flow rate calculated in the flow rate difference calculating circuit.

15. A flow control device according to claim 10, characterized in that the output portion comprises a signal portion for informing that there are over and short in a flow rate of a discharged fluid when there are over and short.

16. A flow control device according to claim 1, wherein:
the flow control device comprises an output portion for outputting the flow rate calculated in the flow rate calculating portion to an outside of the flow rate calculating portion.

* * * * *